(12) United States Patent
Ozone et al.

(10) Patent No.: US 12,490,000 B2
(45) Date of Patent: Dec. 2, 2025

(54) SOLID-STATE IMAGING DEVICE, IMAGING DEVICE, PROCESSING METHOD IN SOLID-STATE IMAGING DEVICE, AND PROCESSING METHOD IN IMAGING DEVICE

(71) Applicant: SONY SEMICONDUCTOR SOLUTIONS CORPORATION, Kanagawa (JP)

(72) Inventors: Takayoshi Ozone, Kanagawa (JP); Tsutomu Haruta, Kanagawa (JP); Toshinobu Sugiyama, Kanagawa (JP); Junichi Sakamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 155 days.

(21) Appl. No.: 18/549,464

(22) PCT Filed: Feb. 25, 2022

(86) PCT No.: PCT/JP2022/007836
§ 371 (c)(1),
(2) Date: Sep. 7, 2023

(87) PCT Pub. No.: WO2022/196288
PCT Pub. Date: Sep. 22, 2022

(65) Prior Publication Data
US 2024/0179429 A1 May 30, 2024

(30) Foreign Application Priority Data
Mar. 16, 2021 (JP) .................. 2021-042001

(51) Int. Cl.
*H04N 25/772* (2023.01)
*H04N 25/672* (2023.01)

(52) U.S. Cl.
CPC ......... *H04N 25/772* (2023.01); *H04N 25/672* (2023.01)

(58) Field of Classification Search
CPC .......................... H04N 25/772; H04N 25/672
(Continued)

(56) References Cited

FOREIGN PATENT DOCUMENTS

| JP | 2001-094882 A | 4/2001 |
|----|---------------|--------|
| JP | 2002-077737 A | 3/2002 |

(Continued)

OTHER PUBLICATIONS

International Search Report and Written Opinion of PCT Application No. PCT/JP2022/007836, issued on May 10, 2022, 09 pages of ISRWO.

*Primary Examiner* — Joel W Fosselman
(74) *Attorney, Agent, or Firm* — CHIP LAW GROUP

(57) ABSTRACT

Provided is a solid-state imaging device that includes a plurality of pixels and an arithmetic section. Each of the plurality of pixels includes a photoelectric conversion section (SP) that generates a charge according to the amount of received light and a capacitor (C) provided so as to be able to share accumulation of the charge generated in the photoelectric conversion section (SP) with the photoelectric conversion section (SP). The arithmetic section subtracts a noise signal level according to noise occurring in the capacitor (C) due to temperature from a pixel signal level according to the charge generated in the photoelectric conversion section (SP) and accumulated in the photoelectric conversion section (SP) and the capacitor (C).

13 Claims, 15 Drawing Sheets

(58) Field of Classification Search
USPC .......................................................... 348/241
See application file for complete search history.

(56) References Cited

FOREIGN PATENT DOCUMENTS

| | | | |
|---|---|---|---|
| JP | 2005-328493 A | | 11/2005 |
| JP | 2005328493 | * | 11/2005 |
| JP | 2011-223477 A | | 11/2011 |

* cited by examiner

TEMPERATURE T2

FIG.15
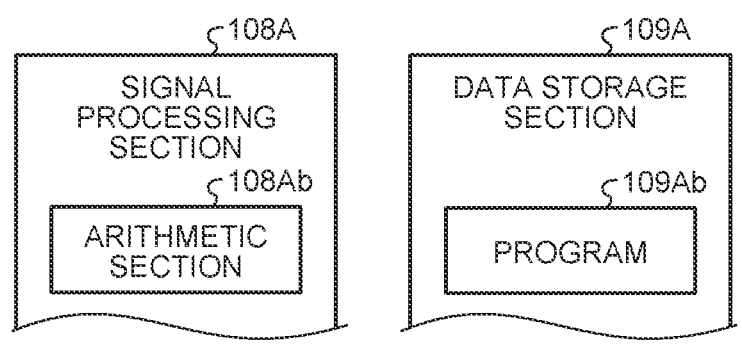
or
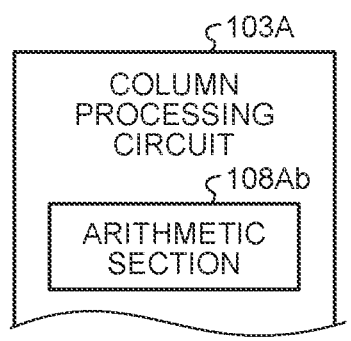

FIG.19
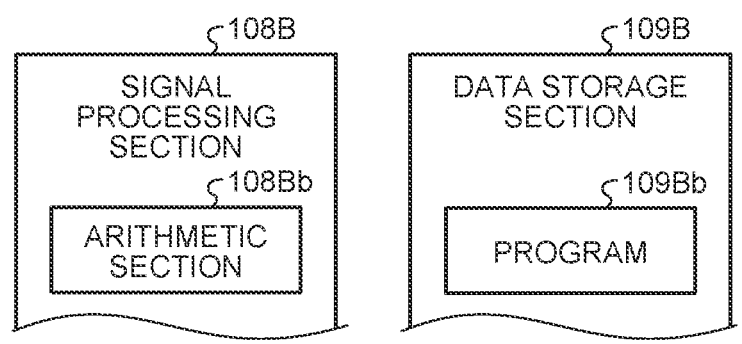
or
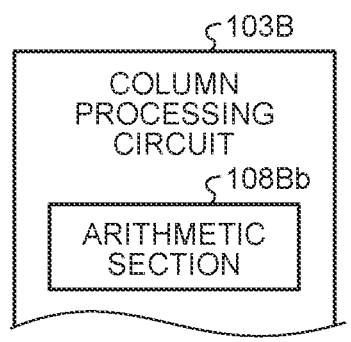

SOLID-STATE IMAGING DEVICE, IMAGING DEVICE, PROCESSING METHOD IN SOLID-STATE IMAGING DEVICE, AND PROCESSING METHOD IN IMAGING DEVICE

CROSS REFERENCE TO RELATED APPLICATIONS

This application is a U.S. National Phase of International Patent Application No. PCT/JP2022/007836 filed on Feb. 25, 2022, which claims priority benefit of Japanese Patent Application No. JP 2021-042001 filed in the Japan Patent Office on Mar. 16, 2021. Each of the above-referenced applications is hereby incorporated herein by reference in its entirety.

FIELD

The present disclosure relates to a solid-state imaging device, an imaging device, a processing method in a solid-state imaging device, a processing program in a solid-state imaging device, a processing method in an imaging device, and a processing program in an imaging device.

BACKGROUND

There have been proposed various techniques for improving image quality of a captured image (refer to Patent Literature 1, for example).

CITATION LIST

Patent Literature

Patent Literature 1: JP 2011-223477 A

SUMMARY

Technical Problem

In line with a trend in which a mobile body such as a vehicle and a robot has higher autonomy and popularization of Internet of Things (IOT) or the like, there is an increasing demand for image quality improvement. One of issues to be considered for image quality improvement is achievement of a wide dynamic range (WDR). For example, suppression of saturation of a photoelectric conversion section such as a photodiode is effective for the achievement. One conceivable method of suppressing saturation is to store charges also in a capacitor, which is electrically connected to the photoelectric conversion section. However, there is a problem of SNR drop, specifically, a state in which an occurrence of noise in the capacitor due to temperature lowers a signal to noise ratio (SNR).

The present disclosure provides a solid-state imaging device, an imaging device, a processing method in a solid-state imaging device, a processing program in a solid-state imaging device, a processing method in an imaging device, and a processing program in an imaging device, which are capable of suppressing SNR drop while achieving WDR.

Solution to Problem

According to one aspect of the present disclosure, a solid-state imaging device includes: a plurality of pixels; and an arithmetic section, each of the plurality of pixels includes: a photoelectric conversion section that generates a charge according to an amount of received light; and a capacitor provided so as to be able to share accumulation of the charge generated in the photoelectric conversion section with the photoelectric conversion section, the arithmetic section is provided to subtract a noise signal level according to noise occurring in the capacitor due to temperature from a pixel signal level according to the charge generated in the photoelectric conversion section and accumulated in the photoelectric conversion section and the capacitor.

According to one aspect of the present disclosure, an imaging device includes: a solid-state imaging device; and an arithmetic section, the solid-state imaging device includes a plurality of pixels, each of the plurality of pixels includes: a photoelectric conversion section that generates a charge according to an amount of received light; and a capacitor provided so as to be able to share accumulation of the charge generated in the photoelectric conversion section with the photoelectric conversion section, the arithmetic section is provided to subtract a noise signal level according to noise occurring in the capacitor due to temperature from a pixel signal level according to the charge generated in the photoelectric conversion section and accumulated in the photoelectric conversion section and the capacitor.

According to one aspect of the present disclosure, a processing method in a solid-state imaging device, the solid-state imaging device includes a plurality of pixels, each of the plurality of pixels includes: a photoelectric conversion section that generates a charge according to an amount of received light; and a capacitor provided so as to be able to share accumulation of the charge generated in the photoelectric conversion section with the photoelectric conversion section, the processing method includes subtracting a noise signal level according to noise occurring in the capacitor due to temperature from a pixel signal level according to the charge generated in the photoelectric conversion section and accumulated in the photoelectric conversion section and the capacitor.

According to one aspect of the present disclosure, a processing program in a solid-state imaging device, the solid-state imaging device includes a plurality of pixels, each of the plurality of pixels includes: a photoelectric conversion section that generates a charge according to an amount of received light; and a capacitor provided so as to be able to share accumulation of the charge generated in the photoelectric conversion section with the photoelectric conversion section, the processing program is provided to cause a computer to execute subtraction of a noise signal level according to noise occurring in the capacitor due to temperature from a pixel signal level according to the charge generated in the photoelectric conversion section and accumulated in the photoelectric conversion section and the capacitor.

According to one aspect of the present disclosure, a processing method in an imaging device, the imaging device includes a solid-state imaging device, the solid-state imaging device includes a plurality of pixels, each of the plurality of pixels includes: a photoelectric conversion section that generates a charge according to an amount of received light; and a capacitor provided so as to be able to share accumulation of the charge generated in the photoelectric conversion section with the photoelectric conversion section, the processing method includes subtracting a noise signal level according to noise occurring in the capacitor due to temperature from a pixel signal level according to the charge generated in the photoelectric conversion section and accumulated in the photoelectric conversion section and the capacitor.

According to one aspect of the present disclosure, a processing program in an imaging device, the imaging device includes a solid-state imaging device, the solid-state imaging device includes a plurality of pixels, each of the plurality of pixels includes: a photoelectric conversion section that generates a charge according to an amount of received light and including a capacitor provided so as to be able to share accumulation of the charge generated in the photoelectric conversion section with the photoelectric conversion section, the processing program is provided to cause a computer to execute subtraction of a noise signal level according to noise occurring in the capacitor due to temperature from a pixel signal level according to the charge generated in the photoelectric conversion section and accumulated in the photoelectric conversion section and the capacitor.

BRIEF DESCRIPTION OF DRAWINGS

FIG. 15 is a diagram illustrating an example of functional blocks of a signal processing section (or a column processing circuit) and a data storage section.

FIG. 19 is a diagram illustrating an example of functional blocks of a signal processing section (or a column processing circuit) and a data storage section.

DESCRIPTION OF EMBODIMENTS

Figure 1:
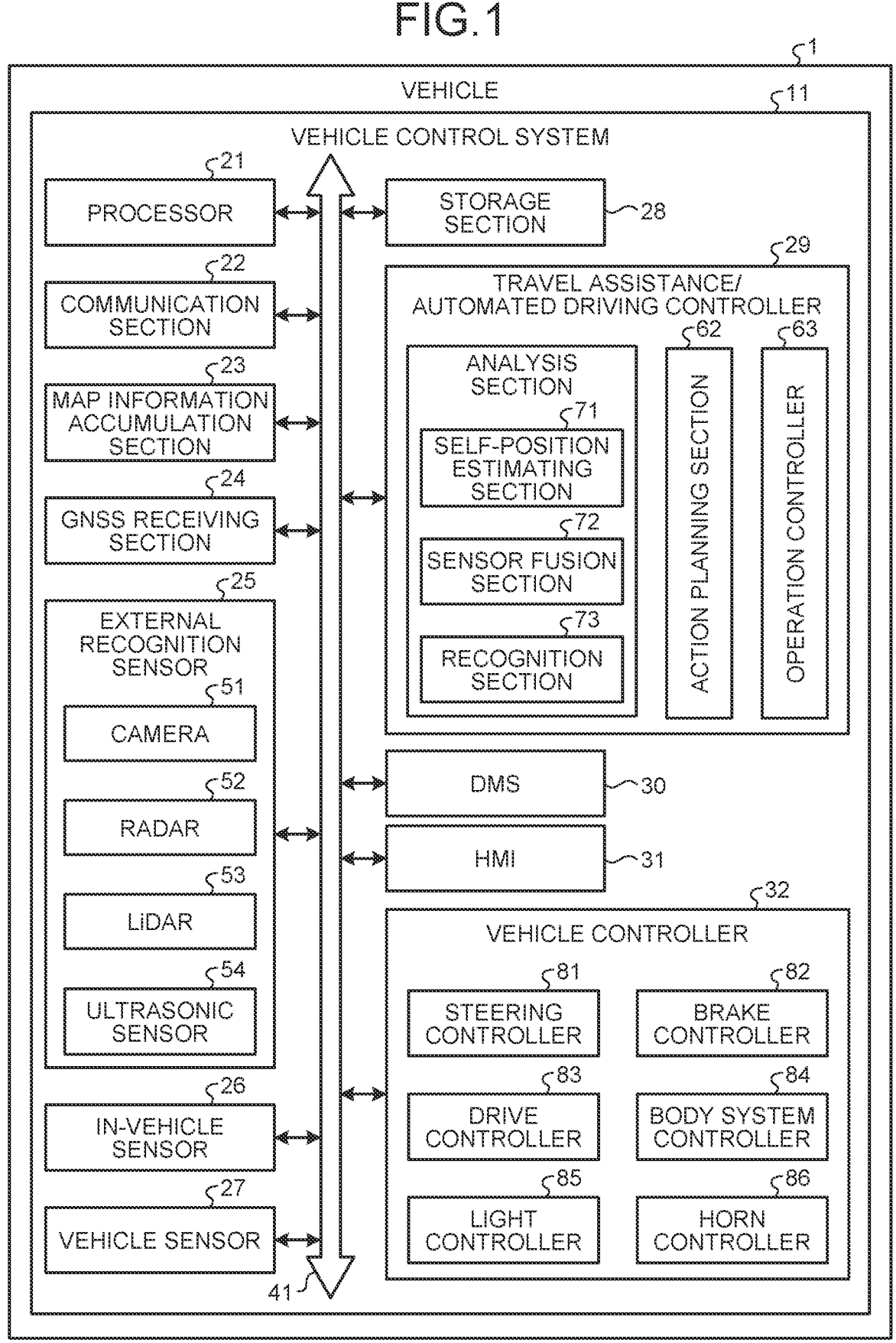
FIG. 1 is a diagram illustrating an example of a schematic configuration of a vehicle control system.

Embodiments of the present disclosure will be described below in detail with reference to the drawings. Note that, in the following embodiments, the same elements are denoted by the same reference symbols, and a repetitive description thereof will be omitted.

The present disclosure will be described in the following order.

1. Embodiments
1.1 Configuration example of vehicle control system
1.2 Configuration example of solid-state imaging device
1.3 SNR drop
1.4 First method
1.5 Second method
1.6 Third method
2. Modification
3. Exemplary effects 1. Embodiments In an embodiment, the disclosed technology is applied to a mobile device control system. An example of the mobile device control system is a vehicle control system, which will be described with reference to FIG. 1.

1.1 Configuration Example of Vehicle Control System

FIG. 1 is a diagram illustrating an example of a schematic configuration of a vehicle control system. A vehicle control system 11 is installed in a vehicle 1 and performs processing related to travel assistance and automated driving regarding the vehicle 1.

The vehicle control system 11 includes a vehicle control Electronic Control Unit (ECU) 21, a communication section 22, a map information accumulation section 23, a global navigation satellite system (GNSS) receiving section 24, an external recognition sensor 25, an in-vehicle sensor 26, a vehicle sensor 27, a recording section 28, a travel assistance/automated driving controller 29, a driver monitoring system (DMS) 30, a Human Machine Interface (HMI) 31, and a vehicle controller 32.

The vehicle control ECU 21, the communication section 22, the map information accumulation section 23, the GNSS receiving section 24, the external recognition sensor 25, the in-vehicle sensor 26, the vehicle sensor 27, the recording section 28, the travel assistance/automated driving controller 29, the DMS 30, the HMI 31, and the vehicle controller 32 are communicably connected to each other via a communication network 41. The communication network 41 includes, for example, an in-vehicle communication network, a bus, or the like conforming to a digital bidirectional communication standard such as a Controller Area Network (CAN), a Local Interconnect Network (LIN), a Local Area Network (LAN), FlexRay (registered trademark), and Ethernet (registered trademark). The communication network 41 may be selectively used depending on the type of data to be transferred in communication. For example, CAN is applied to data related to vehicle control, while Ethernet is applied to large-capacity data. Individual portions of the vehicle control system 11 may be directly connected to each other without intervening the communication network 41, for example, by using wireless communication that assumes communication at a relatively short distance, such as near field communication (NFC) or Bluetooth (registered trademark).

Note that, hereinafter, in a case where individual portions of the vehicle control system 11 performs communication via the communication network 41, description of the communication network 41 will be omitted. For example, when the vehicle control ECU 21 and the communication section 22 communicate with each other via the communication network 41, it is simply described that the vehicle control ECU 21 and the communication section 22 communicate with each other.

The vehicle control ECU 21 includes various processors such as a Central Processing Unit (CPU) and a Micro Processing Unit (MPU), for example. The vehicle control ECU 21 controls the entire or partial function of the vehicle control system 11.

The communication section 22 communicates with various devices inside and outside the vehicle, other vehicles, servers, base stations, and the like, and transmits and receives various data. At this time, the communication section 22 can perform communication using a plurality of communication schemes.

Communication with the outside of the vehicle executable by the communication section 22 will be schematically described. The communication section 22 communicates with a server or the like existing on an external network (hereinafter, referred to as an external server) via a base station or an access point by a wireless communication scheme such as 5th generation (5G) mobile communication system), Long Term Evolution (LTE), or Dedicated Short Range Communications (DSRC). Examples of the external network with which the communication section 22 performs communication include the Internet, a cloud network, and a network unique to an organization. The communication scheme by which the communication section 22 communicates with an external network is not particularly limited as long as it is a wireless communication scheme capable of performing digital bidirectional communication at a predetermined communication speed or more and at a predetermined distance or more.

Furthermore, for example, the communication section 22 can communicate with a terminal existing in the vicinity of a host vehicle using a peer to peer (P2P) technology. Examples of the terminal present in the vicinity of the host vehicle include a terminal worn by a mobile body moving at a relatively low speed such as a pedestrian or a bicycle, a terminal installed at a fixed position such as a store, or a Machine Type Communication (MTC) terminal. Furthermore, the communication section 22 can also perform V2X communication. The V2X communication refers to, for example, communication between the host vehicle and another vehicle, such as Vehicle to Vehicle communication with another vehicle, Vehicle to Infrastructure communication with a roadside device or the like, Vehicle to Home communication, and Vehicle to Pedestrian communication with a terminal or the like possessed by a pedestrian.

For example, the communication section 22 can receive, from the outside (Over The Air), a program for updating software that controls the operation of the vehicle control system 11. The communication section 22 can further receive map information, traffic information, information around the vehicle 1, and the like from the outside. Furthermore, for example, the communication section 22 can transmit information such as information related to the vehicle 1 and information around the vehicle 1 to the outside. Examples of the information related to the vehicle 1 transmitted to the outside by the communication section 22 include information such as data indicating the state of the vehicle 1 and a recognition result obtained by the recognition section 73. Furthermore, for example, the communication section 22 performs communication corresponding to a vehicle emergency call system such as an e-Call.

Communication with the inside of the vehicle executable by the communication section 22 will be schematically described. The communication section 22 can communicate with each device in the vehicle using wireless communication, for example. The communication section 22 can perform wireless communication with an in-vehicle device by a communication scheme capable of performing digital bidirectional communication at a predetermined communication speed or more by wireless communication, such as wireless LAN, Bluetooth, NFC, or wireless USB (WUSB). Communication method is not limited thereto, and the communication section 22 can also communicate with each device in the vehicle using wired communication. For example, the communication section 22 can communicate with each device in the vehicle by wired communication via a cable connected to a connection terminal (not illustrated). The communication section 22 can communicate with each device in the vehicle by a communication scheme capable of performing digital bidirectional communication at a predetermined communication speed or more by wired communication, such as Universal Serial Bus (USB), High-Definition Multimedia Interface (HDMI) (registered trademark), or Mobile High-definition Link (MHL).

Here, the in-vehicle device refers to a device existing in the vehicle and not connected to the communication network 41, for example. Assumable examples of the in-vehicle device include a mobile device or a wearable device carried by an occupant such as a driver, an information device brought into the vehicle for temporary installation.

For example, the communication section 22 receives an electromagnetic wave transmitted by a road traffic information communication system (Vehicle Information and Communication System (VICS) (registered trademark), such as a radio wave beacon, an optical beacon, or FM multiplex broadcasting.

The map information accumulation section 23 accumulates one or both of a map acquired from the outside and a map created by the vehicle 1. For example, the map information accumulation section 23 accumulates maps such as a three-dimensional high-precision map and a global map having lower precision than the high-precision map and covering a wide area.

Examples of the high-precision map include a dynamic map, a point cloud map, and a vector map. The dynamic map is a map including four layers of dynamic information, semi-dynamic information, semi-static information, and static information, and is provided to the vehicle 1 from an external server or the like. The point cloud map is a map including point clouds (point cloud data). Here, the vector map indicates a map adapted to an Advanced Driver Assistance System (ADAS) in which traffic information such as lanes and the positions of traffic control signals is associated with a point cloud map.

The point cloud map and the vector map may be provided from, for example, an external server or the like, or may be created by the vehicle 1 as a map for performing matching with a local map to be described below based on a sensing result from the radar 52, the LiDAR 53, or the like, and may be accumulated in the map information accumulation section 23. In a case where a high-precision map is provided from an external server or the like, for example, map data of several hundred meters square regarding a planned path of the vehicle 1 for future travel is acquired from the external server or the like in order to reduce the communication traffic.

The GNSS receiving section 24 receives a GNSS signal from a GNSS satellite and acquires position information of the vehicle 1. The received GNSS signal is supplied to the travel assistance/automated driving controller 29. Note that the GNSS receiving section 24 may acquire the position information using a beacon, for example, not limited to the method using the GNSS signal.

The external recognition sensor 25 includes various sensors used for recognizing a situation outside the vehicle 1, and supplies sensor data from the individual sensors to individual portions of the vehicle control system 11. The type and number of sensors included in the external recognition sensor 25 can be optionally determined.

For example, the external recognition sensor 25 includes a camera 51, a radar 52, a Light Detection and Ranging, Laser Imaging Detection and Ranging (LiDAR) 53, and an ultrasonic sensor 54. The configuration is not limited thereto, and the external recognition sensor 25 may be configured to include one or more types of sensors among the camera 51, the radar 52, the LiDAR 53, and the ultrasonic sensor 54. The numbers of the cameras 51, the radars 52, the LiDAR 53, and the ultrasonic sensors 54 are not particularly limited as long as they can be practically installed in the vehicle 1. Furthermore, the type of sensor included in the external recognition sensor 25 is not limited to this example, and the external recognition sensor 25 may include other types of sensors. An example of the sensing region of each sensor included in the external recognition sensor 25 will be described below.

Note that the image capturing scheme of the camera 51 is not particularly limited as long as it is an image capturing scheme capable of distance measurement. For example, regarding the camera 51, cameras using various image capturing scheme, such as a time of flight (ToF) camera, a stereo camera, a monocular camera, and an infrared camera, can be adopted as necessary. The type of the camera is not limited thereto, and the camera 51 may be a device that simply acquires a captured image regardless of distance measurement.

Furthermore, for example, the external recognition sensor 25 can include an environmental sensor for detecting the environment for the vehicle 1. The environmental sensor is a sensor for detecting an environment such as weather, atmospheric phenomena, and brightness, and can include various sensors such as a raindrop sensor, a fog sensor, a daylight sensor, a snow sensor, and an illuminance sensor.

Furthermore, for example, the external recognition sensor 25 includes a microphone used for detecting a sound around the vehicle 1, the position of a sound source, and the like.

The in-vehicle sensor 26 includes various sensors for detecting information inside the vehicle, and supplies sensor data from each sensor to individual portions of the vehicle control system 11. The types and the number of various sensors included in the in-vehicle sensor 26 are not particularly limited as long as they can be practically installed in the vehicle 1.

For example, the in-vehicle sensor 26 can include one or more types of sensors out of a camera, a radar, a seating sensor, a steering wheel sensor, a microphone, and a biometric sensor. The camera included in the in-vehicle sensor 26 can be, for example, cameras of various image capturing scheme capable of measuring a distance, such as a ToF camera, a stereo camera, a monocular camera, and an infrared camera. The type of the camera included in the in-vehicle sensor 26 is not limited thereto, and the camera may be a device that simply acquires a captured image regardless of distance measurement. The biometric sensor included in the in-vehicle sensor 26 is installed at positions such as a seat and a steering wheel to detect various types of biometric information of the occupant such as the driver.

The vehicle sensor 27 includes various sensors for detecting the state of the vehicle 1, and supplies sensor data from each sensor to individual portions of the vehicle control system 11. The types and the number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the rotation speed of the engine or the motor, an air pressure sensor that detects the air pressure of the tire, a slip rate sensor that detects the slip rate of the tire, and a wheel speed sensor that detects the rotation speed of the wheel. For example, the vehicle sensor 27 includes a battery sensor that detects the remaining amount and temperature of the battery, and an impact sensor that detects an external impact.

The recording section 28 includes at least one of a nonvolatile storage medium or a volatile storage medium, and stores data and a program. The recording section 28 can be used as Electrically Erasable Programmable Read Only Memory (EEPROM) and random access memory (RAM), and applicable storage media include a magnetic storage device such as a hard disc drive (HDD), a semiconductor storage device, an optical storage device, and a magneto-optical device. The recording section 28 records various programs and data used by individual portions of the vehicle control system 11. For example, the recording section 28 includes an Event Data Recorder (EDR) and a Data Storage System for Automated Driving (DSSAD), and records information regarding the vehicle 1 before and after an event such as an accident and biometric information acquired by the in-vehicle sensor 26.

The travel assistance/automated driving controller 29 controls travel assistance and automated driving of the vehicle 1. For example, the travel assistance/automated driving controller 29 includes an analysis section 61, an action planning section 62, and an operation controller 63.

The analysis section 61 performs analysis processing of the situation of the vehicle 1 and the surroundings. The analysis section 61 includes a self-position estimating section 71, a sensor fusion section 72, and a recognition section 73.

The self-position estimating section 71 estimates the self-position of the vehicle 1 based on the sensor data from the external recognition sensor 25 and the high-precision map accumulated in the map information accumulation section 23. For example, the self-position estimating section 71 generates a local map based on the sensor data from the external recognition sensor 25, and estimates the self-position of the vehicle 1 by matching the local map with the high-precision map. The position of the vehicle 1 is based on, for example, the center of the axle of the rear wheel pair.

Examples of the local map include a three-dimensional high-precision map and an Occupancy Grid Map created using a technique such as Simultaneous Localization and Mapping (SLAM). Examples of the three-dimensional high-precision map include the above-described point cloud map. The occupancy grid map is a map in which a three-dimensional or two-dimensional space around the vehicle 1 is divided into grids (lattice) of a predetermined size, and an occupancy state of an object is indicated in units of grids. The occupancy state of the object is indicated by, for example, the presence or absence or existence probability of the object. The local map is also used for detection processing and recognition processing of a situation outside the vehicle 1 performed by the recognition section 73, for example.

Note that the self-position estimating section 71 may estimate the self-position of the vehicle 1 based on the GNSS signal and the sensor data from the vehicle sensor 27.

The sensor fusion section 72 performs sensor fusion processing of combining a plurality of different types of sensor data (for example, image data supplied from the camera 51 and sensor data supplied from the radar 52) to obtain new information. Methods of combining different types of sensor data include integration, merging, association, and the like.

The recognition section 73 executes detection processing of detecting a situation outside the vehicle 1 and recognition processing of recognizing a situation outside the vehicle 1.

For example, the recognition section 73 performs detection processing and recognition processing of a situation outside the vehicle 1 based on information such as information from the external recognition sensor 25, information from the self-position estimating section 71, and information from the sensor fusion section 72.

Specifically, for example, the recognition section 73 performs detection processing, recognition processing, and the like of an object around the vehicle 1. The object detection processing is, for example, processing of detecting the presence or absence, size, shape, position, motion, and the like of an object. The object recognition processing is processing of recognizing an attribute such as a type of an object or identifying a specific object, for example. However, the detection processing and the recognition processing are not necessarily clearly divided, and may overlap each other.

For example, the recognition section 73 performs clustering of grouping point clouds based on sensor data from the LiDAR 53, the radar 52, or the like into clusters of point clouds, thereby detecting an object around the vehicle 1. With this operation, the presence or absence, size, shape, and position of an object around the vehicle 1 are detected.

For example, the recognition section 73 performs tracking being a follow-up operation to the motion of the cluster of the point cloud grouped by clustering, thereby detecting the motion of the object around the vehicle 1. With this operation, the speed and the traveling direction (movement vector) of the object around the vehicle 1 are detected.

For example, the recognition section 73 detects or recognizes a vehicle, a person, a bicycle, an obstacle, a structure, a road, a traffic light, a traffic sign, a road sign, and the like on the image data supplied from the camera 51. In addition, the type of the object around the vehicle 1 may be recognized by performing recognition processing such as semantic segmentation.

For example, the recognition section 73 can perform recognition processing of traffic rules around the vehicle 1 based on a map accumulated in the map information accumulation section 23, self-position estimation results from the self-position estimating section 71, and a recognition result of an object around the vehicle 1 obtained by the recognition section 73. With this processing, the recognition section 73 can recognize information such as the position and the state of the traffic control signal, details of the traffic sign and the road marking, details of the traffic regulation, and the travelable lane.

For example, the recognition section 73 can perform recognition processing of a surrounding environment of the vehicle 1. Assumable examples of the surrounding environment to be recognized by the recognition section 73 include weather, temperature, humidity, brightness, and a state of a road surface.

The action planning section 62 creates an action plan of the vehicle 1. For example, the action planning section 62 creates an action plan by performing processes of path planning and path follow-up.

The path planning (also referred to as global path planning) is a process of planning a rough path from the start to the goal. This path plan is also referred to as a track plan, and includes processing of track generation (referred to as local path planning) that enables safe and smooth traveling in the vicinity of the vehicle 1 in consideration of the motion characteristics of the vehicle 1 along the path planned by the path plan. It is also allowable to make a distinction such that path planning is to be long-term path planning while path generation is to be short-term path planning or local path planning. The safety-first path represents a concept similar to path generation, short-term path planning, or local path planning.

Path follow-up is a process of planning an operation for safely and accurately traveling a path planned by a path plan within a planned time. For example, the action planning section 62 can calculate a target speed and target angular velocity of the vehicle 1 based on the result of the path follow-up process.

The operation controller 63 controls the operation of the vehicle 1 in order to realize the action plan created by the action planning section 62.

For example, the operation controller 63 controls a steering controller 81, a brake controller 82, and a drive controller 83 included in the vehicle controller 32 to be described below, and performs acceleration/deceleration control and direction control to allow the vehicle 1 to travel on the track calculated by the track plan. For example, the operation controller 63 performs cooperative control for the purpose of implementing the ADAS functions such as collision avoidance or impact mitigation, follow-up traveling, traveling under cruise control, collision warning of the host vehicle, and lane departure warning of the host vehicle. For example, the operation controller 63 performs cooperative control for the purpose of automated driving or the like in which the vehicle autonomously travels without depending on the operation of the driver.

The DMS 30 performs processing such as authentication processing of the driver and recognition processing of the state of the driver based on data such as sensor data from the in-vehicle sensor 26 and input data input to the HMI 31 to be described below. In this case, assumable examples of the state of the driver to be recognized by the DMS 30 include physical conditions, a wakefulness level, a concentration level, a fatigue level, a line-of-sight direction, a drunkenness level, a driving operation, and a posture.

Note that the DMS 30 may perform authentication processing of an occupant other than the driver and recognition processing of the state of the occupant. Furthermore, for example, the DMS 30 may perform recognition processing of the situation inside the vehicle based on sensor data from the in-vehicle sensor 26. Assumable examples of the situation inside the vehicle to be recognized include temperature, humidity, brightness, and odor.

The HMI 31 inputs various data, instructions, and the like, and presents various data to the driver or the like.

Data input performed by the HMI 31 will be schematically described. The HMI 31 includes an input device for a person to input data. The HMI 31 generates an input signal based on data, an instruction, or the like input by an input device, and supplies the input signal to individual portions of the vehicle control system 11. Examples of the input device provided in the HMI 31 include an operating element such as a touch panel, a button, a switch, and a lever. Other than these, the HMI 31 may further include an input device capable of inputting information by a method other than manual operation, such as by voice or gesture. Furthermore, the HMI 31 may use, as the input device, a remote control device using infrared rays or radio waves, or an external connection device such as a mobile device or a wearable device corresponding to the operation of the vehicle control system 11, for example.

Presentation of data by the HMI 31 will be schematically described. The HMI 31 generates visual information, auditory information, and tactile information for the occupant or the outside of the vehicle. In addition, the HMI 31 performs output control that controls the output of each piece of generated information, details of the output, output timing, output method, and the like. The HMI 31 generates and outputs, as the visual information, information indicated by images or light, such as an operation screen, a state display of the vehicle 1, a warning display, and a monitor image indicating a situation around the vehicle 1. In addition, the HMI 31 generates and outputs, as the auditory information, information indicated by sounds such as voice guidance, a warning sound, and a warning message, for example. Further, the HMI 31 generates and outputs, as the tactile information, information given to the tactile sense of the occupant, such as force, vibration, motion, for example.

Applicable examples of the output device on which the HMI 31 outputs visual information include a display device that presents visual information by displaying an image on itself or a projector device that presents visual information based on a projected image. The display device may be a device that displays visual information in the field of view of the occupant, such as a head-up display, a transmissive display, or a wearable device having an augmented reality (AR) function, in addition to a display device having a normal display. The HMI 31 can also use a display device included in a component of the vehicle 1, such as a navigation device, an instrument panel, a camera monitoring system (CMS), an electronic mirror, or a lamp, as an output device that outputs visual information.

Applicable examples of the output device on which the HMI 31 outputs auditory information include an audio speaker, a headphone, and an earphone.

Applicable examples of an output device to which the HMI 31 outputs tactile information include a haptic element using a haptic technology. The haptics element is provided at a portion with which an occupant of the vehicle 1 comes into contact, such as a steering wheel or a seat.

The vehicle controller 32 controls individual portions of the vehicle 1. The vehicle controller 32 includes a steering controller 81, a brake controller 82, a drive controller 83, a body system controller 84, a light controller 85, and a horn controller 86.

The steering controller 81 detects and controls a state of the steering system of the vehicle 1. The steering system includes components such as a steering mechanism including a steering wheel, and an electric power steering, for example. The steering controller 81 includes components such as a control unit like an ECU that controls the steering system, and an actuator that drives the steering system, for example.

The brake controller 82 detects and controls the state of a brake system of the vehicle 1. The brake system includes components such as a brake mechanism including a brake pedal, an antilock brake system (ABS), and a regenerative brake mechanism, for example. The brake controller 82 includes components such as a control unit like an ECU that controls the brake system.

The drive controller 83 detects and controls the state of a drive system of the vehicle 1. The drive system includes components such as an accelerator pedal, a driving force generation device for generating a driving force, like an internal combustion engine or a driving motor, and a driving force transmission mechanism for transmitting the driving force to wheels, for example. The drive controller 83 includes components such as a control unit like an ECU that controls the drive system.

The body system controller 84 detects and controls the state of a body system of the vehicle 1. The body system includes components such as a keyless entry system, a smart key system, a power window device, a power seat, an air conditioner, an airbag, a seat belt, and a gear lever, for example. The body system controller 84 includes components such as a control unit like an ECU that controls the body system.

The light controller 85 detects and controls states of various lights of the vehicle 1. Assumable examples of the light to be controlled include a headlight, a backlight, a fog light, a turn signal, a brake light, a projection, and a display of a bumper. The light controller 85 includes components such as a control unit like an ECU that performs light control.

The horn controller 86 detects and controls the state of a car horn of the vehicle 1. The horn controller 86 includes components such as a control unit like an ECU that controls the car horn.

Figure 2:
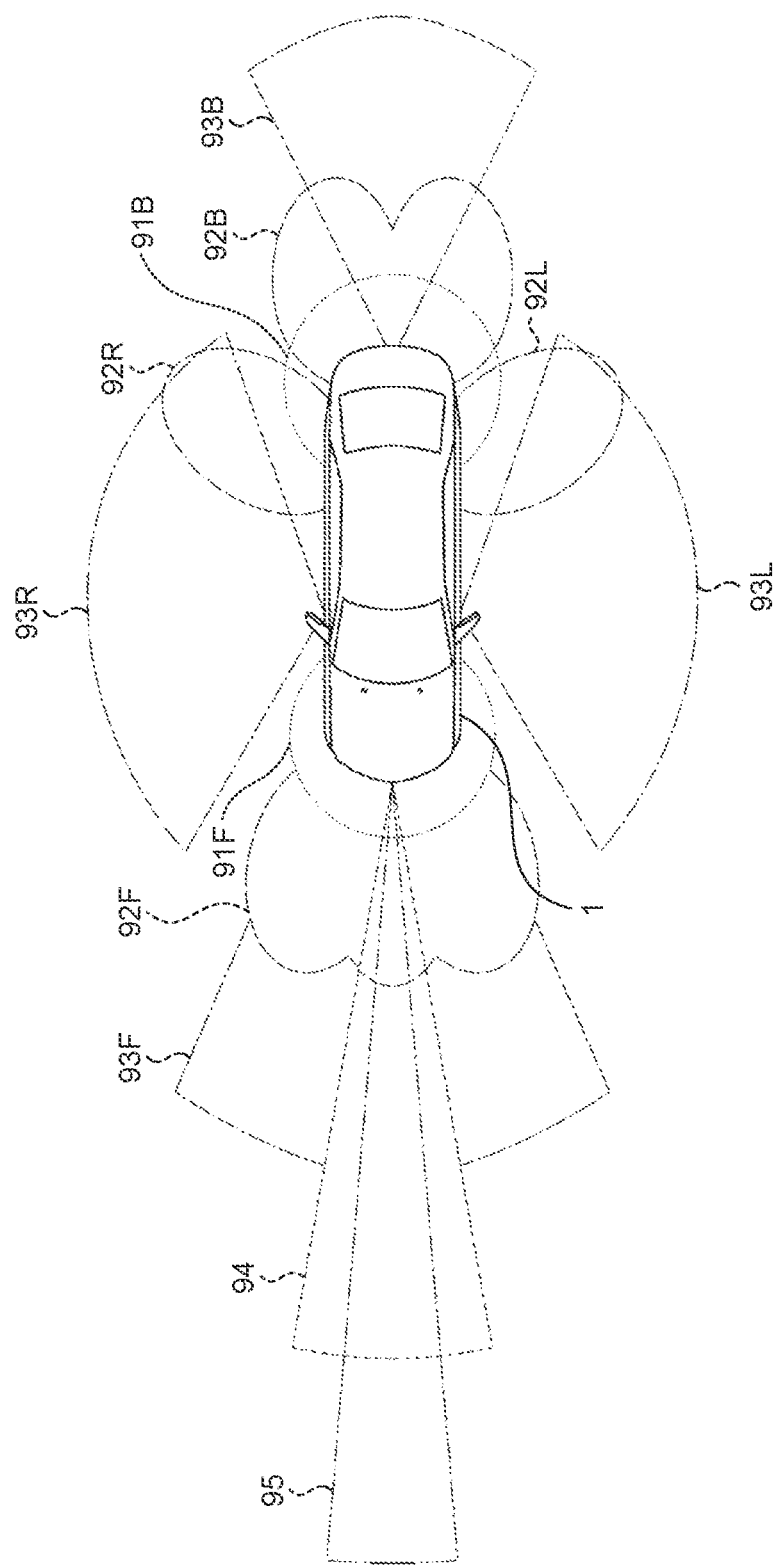
FIG. 2 is a diagram illustrating an example of a sensing region.

FIG. 2 is a diagram illustrating an example of a sensing region. The sensing region is a region sensed by the components of the external recognition sensor 25, such as the camera 51, the radar 52, the LiDAR 53, and the ultrasonic sensor 54 described above with reference to FIG. 1. Note that FIG. 2 schematically illustrates the top view of the vehicle 1, in which the left end side corresponds to the front end (front) side of the vehicle 1 while the right end side corresponds to the rear end (rear) side of the vehicle 1.

A sensing region 91F and a sensing region 91B illustrate examples of the sensing region of the ultrasonic sensor 54. The sensing region 91F covers the vicinity of the front end of the vehicle 1 by the plurality of ultrasonic sensors 54. The sensing region 91B covers the vicinity of the rear end of the vehicle 1 by the plurality of ultrasonic sensors 54.

The sensing results in the sensing region 91F and the sensing region 91B are used for parking assistance of the vehicle 1, for example.

The sensing regions 92F to 92B illustrate examples of sensing regions of the radar 52 for a short distance or a middle distance. The sensing region 92F covers a position farther than the sensing region 91F in front of the vehicle 1. The sensing region 92B covers a position farther than the sensing region 91B behind the vehicle 1. The sensing region 92L covers the rear vicinity of the left side surface of the vehicle 1. The sensing region 92R covers the rear vicinity of the right side surface of the vehicle 1.

The sensing result in the sensing region 92F is used to detect a vehicle, a pedestrian, or the like existing in front of the vehicle 1, for example. The sensing result in the sensing region 92B is used for a collision prevention function behind the vehicle 1, for example. The sensing results in the sensing region 92L and the sensing region 92R are used for detecting an object in a blind spot on the sides of the vehicle 1, for example.

The sensing regions 93F to 93B illustrate examples of sensing regions covered by the camera 51. The sensing region 93F covers a position farther than the sensing region 92F in front of the vehicle 1. The sensing region 93B covers a position farther than the sensing region 92B behind the vehicle 1. The sensing region 93L covers the vicinity of the left side surface of the vehicle 1. The sensing region 93R covers the vicinity of the right side surface of the vehicle 1.

The sensing result in the sensing region 93F can be used for recognition of a traffic light or a traffic sign, a lane departure prevention assist system, and an automatic headlight control system, for example. The sensing result in the sensing region 93B can be used for parking assistance and a surround view system, for example. The sensing results in the sensing region 93L and the sensing region 93R can be used for a surround view system, for example.

The sensing region 94 is illustrated as an example of a sensing region of the LiDAR 53. The sensing region 94 covers a position farther than the sensing region 93F in front of the vehicle 1. In contrast, the sensing region 94 has a narrower range in the left-right direction than the sensing region 93F.

The sensing result in the sensing region 94 is used for detecting an object such as a surrounding vehicle, for example.

The sensing region 95 is illustrated as an example of a sensing region of the radar 52 for a long distance. The sensing region 95 covers a position farther than the sensing region 94 in front of the vehicle 1. In contrast, the sensing region 95 has a narrower range in the left-right direction than the sensing region 94.

The sensing result in the sensing region 95 is used for purposes such as Adaptive Cruise Control (ACC), emergency braking, and collision avoidance, for example.

Note that the sensing regions of the sensors of the camera 51, the radar 52, the LiDAR 53, and the ultrasonic sensor 54 included in the external recognition sensor 25 may have various configurations other than those in FIG. 2. Specifically, the ultrasonic sensor 54 may also sense the sides of the vehicle 1, or the LiDAR 53 may sense the rear of the vehicle 1. In addition, the installation position of each sensor is not limited to each example described above. The number of individual sensors may be one or in plurality.

1.2 Configuration Example of Solid-State Imaging Device

The imaging device such as the camera 51 described above may include a solid-state imaging device such as an image sensor. The solid-state imaging device will be described in detail.

Figure 3:
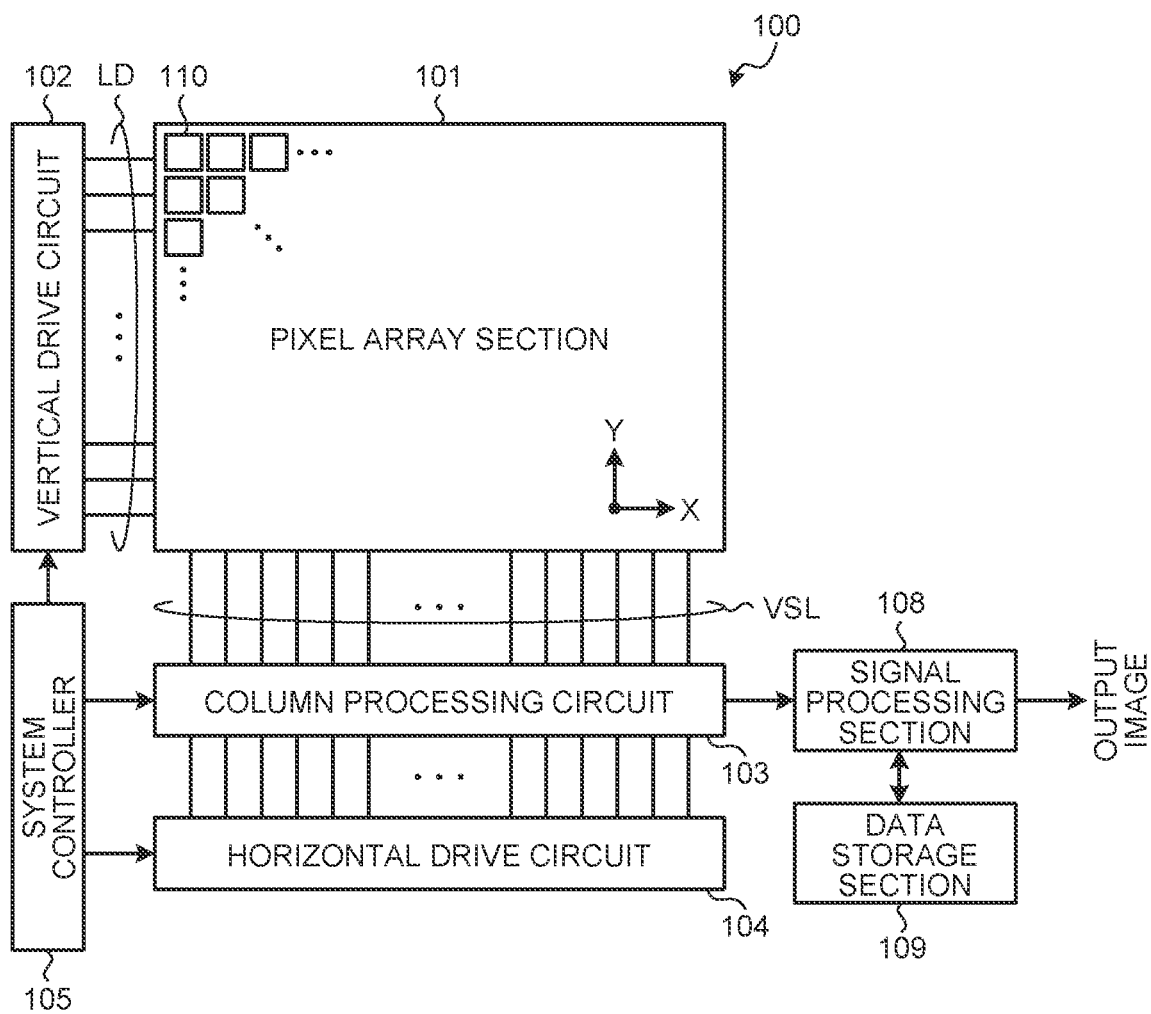
FIG. 3 is a block diagram illustrating a schematic configuration example of a solid-state imaging device.

FIG. 3 is a block diagram illustrating a schematic configuration example of a solid-state imaging device. A solid-state imaging device 100 is an image sensor created by applying or partially using a CMOS process, for example.

The solid-state imaging device 100 has a stacked structure, in which a semiconductor chip on which a pixel array section 101 is formed and a semiconductor chip on which a peripheral circuit is formed are stacked, for example. The peripheral circuit can include a vertical drive circuit 102, a column processing circuit 103, a horizontal drive circuit 104, and a system controller 105, for example.

The solid-state imaging device 100 further includes a signal processing section 108 and a data storage section 109. The signal processing section 108 and the data storage section 109 may be located on the same semiconductor chip as the peripheral circuit, or may be located on a different semiconductor chip.

The pixel array section 101 has a configuration in which pixels 110 having components such as a photoelectric conversion section (photoelectric conversion element) that produces (generates) and accumulates charges according to the amount of received light are arranged in a row direction and a column direction, that is, in a two-dimensional lattice shape in a matrix. Here, the row direction refers to a pixel arrangement direction in a pixel row (lateral direction in drawings), and the column direction refers to a pixel arrangement direction in a pixel column (vertical direction in drawings).

The pixel array section 101 has pixel drive lines LD wired in the row direction for individual pixel rows while having vertical signal lines VSL wired in the column direction for individual pixel columns with regard to the pixel array in a matrix. The pixel drive line LD transmits a drive signal for conducting drive when a signal is read out from a pixel. Although FIG. 3 is a case where the pixel drive lines LD are illustrated as one-to-one wiring patterns, wiring patterns are not limited to this. One end of the pixel drive line LD is connected to an output terminal corresponding to each of rows of the vertical drive circuit 102.

The vertical drive circuit 102 includes a shift register, an address decoder, and the like, and drives all the pixels of the pixel array section 101 simultaneously or row by row. That is, together with the system controller 105 that controls the vertical drive circuit 102, the vertical drive circuit 102 constitutes a drive section that controls the operation of each of pixels of the pixel array section 101. Although a specific configuration of the vertical drive circuit 102 is not illustrated, the vertical drive circuit typically includes two scan systems, namely, a read-out scan system and a sweep-out scan system.

In order to read out a signal from the pixel, the read-out scan system sequentially performs selective scan of pixels 110 of the pixel array section 101 row by row. The signal read out from the pixel 110 is an analog signal. The sweep-out scan system performs sweep-out scan on a read out row on which read-out scan is to be performed by the read-out scan system, prior to the read-out scan by an exposure time.

By the sweep-out scan by the sweep-out scan system, unnecessary charges are swept out from the photoelectric conversion section, etc. of the pixel 110 of the read-out target row, thereby resetting the photoelectric conversion section, and the like. By sweeping out (resetting) unnecessary charges in the sweep-out scan system, an electronic shutter operation is performed. Here, the electronic shutter operation refers to an operation of discarding charges of the photoelectric conversion section, etc. and newly starting exposure (starting accumulation of charges).

The signal read out by the read-out operation by the read-out scan system corresponds to the amount of light received after the immediately preceding read-out operation or electronic shutter operation. The period from the read-out timing by the immediately preceding read-out operation or the sweep-out timing of the electronic shutter operation to the read-out timing of the current read-out operation corresponds to a charge accumulation period (also referred to as an exposure period) in the pixel 110. An example of the length of the exposure period (exposure time) of one frame is about 16.7 msec (corresponding to 60 fps).

A signal output from each pixel 110 in the pixel row selectively scanned by the vertical drive circuit 102 is input to the column processing circuit 103 via each of the vertical signal lines VSL for each pixel column. The column processing circuit 103 performs predetermined signal processing on the signal output from each pixel of the selected row via the vertical signal line VSL for each pixel column of the pixel array section 101, and temporarily holds (holds in line memory) the signal that has undergone the signal processing (for example, the signal that has undergone AD conversion).

Specifically, the column processing circuit 103 may perform noise removal processing, for example, correlated double sampling (CDS) processing or double data sampling (DDS) processing. For example, the CDS processing removes noise unique to the pixel such as reset noise and threshold variation of the amplification transistor in the pixel. The column processing circuit 103 also has an analog-digital (AD) conversion function, for example, and converts an analog signal (level) obtained by reading out from the photoelectric conversion section into a digital signal, and outputs the obtained digital signal.

The horizontal drive circuit 104 includes a shift register, an address decoder, and the like, and sequentially selects a read-out circuit (hereinafter, referred to as a pixel circuit) corresponding to a pixel column of the column processing circuit 103. By the selective scan performed by the horizontal drive circuit 104, signals subjected to signal processing for each pixel circuit in the column processing circuit 103 are sequentially output.

The system controller 105 includes a timing generator that generates various timing signals and the like, and performs drive control of the vertical drive circuit 102, the column processing circuit 103, the horizontal drive circuit 104, and the like based on various timings generated by the timing generator.

The signal processing section 108 has at least an arithmetic processing function, and performs various signal processing such as arithmetic processing on the signal output from the column processing circuit 103. The data storage section 109 temporarily stores data necessary for processes at signal processing in the signal processing section 108. The data storage section 109 may include nonvolatile memory, for example.

Note that the image data (which may be a pixel signal described below) output from the signal processing section 108 may be, for example, subjected to predetermined processing in the travel assistance/automated driving controller 29 or the like in the vehicle control system 11 equipped with the solid-state imaging device 100, or may be transmitted to the outside via the communication section 22.

Figure 4:
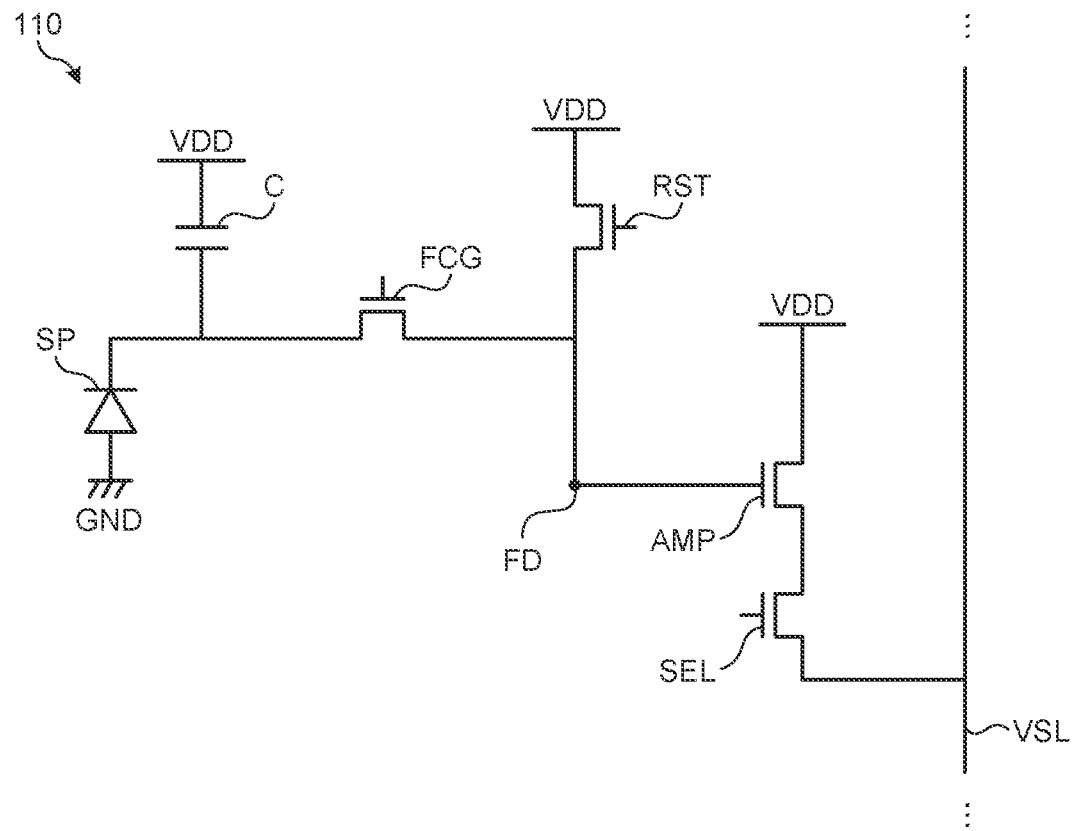
FIG. 4 is a diagram illustrating an example of a schematic configuration of a pixel.

FIG. 4 is a diagram illustrating an example of a schematic configuration of a pixel. The pixel 110 in the example includes a photoelectric conversion section SP, a capacitor C, a transfer transistor FCG, a floating diffusion FD, a reset transistor RST, an amplification transistor AMP, and a selection transistor SEL.

The photoelectric conversion section SP generates and accumulates charges according to the amount of received light. In this example, the photoelectric conversion section SP is a photodiode, having its anode connected to the ground GND and having its cathode connected to the transfer transistor FCG.

The capacitor C is a capacitor (floating capacitor) electrically connected to the photoelectric conversion section SP so that the accumulation of the charge generated in the photoelectric conversion section SP can be shared with the photoelectric conversion section SP. In this example, the capacitor C is directly connected to the photoelectric conversion section SP.

The transfer transistor FCG is connected between the photoelectric conversion section SP and the capacitor C, and the floating diffusion FD, and transfers the charges accumulated in the photoelectric conversion section SP and the capacitor C to the floating diffusion FD. The transfer of the charge is controlled by a signal supplied from the vertical drive circuit 102 (FIG. 3) to the gate of the transfer transistor FCG.

The floating diffusion FD accumulates the charge transferred from the photoelectric conversion section SP and the capacitor C via the transfer transistor FCG. The floating diffusion FD is, for example, a floating diffusion region formed in a semiconductor substrate. A voltage corresponding to the charge accumulated in the floating diffusion FD is applied to the gate of the amplification transistor AMP.

The reset transistor RST is connected between the floating diffusion FD and the power supply VDD, and resets the floating diffusion FD. The photoelectric conversion section SP and the capacitor C are also reset via the transfer transistor FCG and the reset transistor RST. The reset of the floating diffusion FD is controlled by a signal supplied from the vertical drive circuit 102 (FIG. 3) to the gate of the reset transistor RST. Reset of the photoelectric conversion section SP and the capacitor C is controlled by a signal supplied to the gate of the transfer transistor FCG and a signal supplied to the gate of the reset transistor RST, from the vertical drive circuit 102 (FIG. 3).

The amplification transistor AMP outputs a voltage at a level corresponding to the charge accumulated in the floating diffusion FD.

The selection transistor SEL is connected between the amplification transistor AMP and the vertical signal line VSL, and causes an output voltage (signal) of the amplification transistor AMP to appear in the vertical signal line VSL. The appearance of the signal in the vertical signal line VSL is controlled by a signal supplied from the vertical drive circuit 102 (FIG. 3) to the gate of the selection transistor SEL.

The signal appearing in the vertical signal line VSL is input to the column processing circuit 103 as described above with reference to FIG. 3.

1.3 SNR Drop

For example, according to the pixel 110 having the configuration as described above, the charge generated in the photoelectric conversion section SP is accumulated not only in the photoelectric conversion section SP but also in the capacitor C. This increases the storage capacity and makes it easier to achieve WRD correspondingly. On the other hand, noise occurs in the capacitor C due to dark current or the like. The noise occurs due to temperature in particular, and the higher the temperature, the higher the level of the noise.

The noise reduces SNR. Specifically, a signal level corresponding to the charges generated in the photoelectric conversion section SP and accumulated in the photoelectric conversion section SP and the capacitor C is referred to as a "pixel signal level". The signal level corresponding to the noise occurring in the capacitor C due to the temperature (due to the temperature rise) is referred to as a "noise signal level". SNR is a ratio (difference) between the pixel signal level and the noise signal level. As described above, the level of noise increases together with the rise of the temperature, which causes a decrease in SNR, that is, SNR drop.

Figure 5:
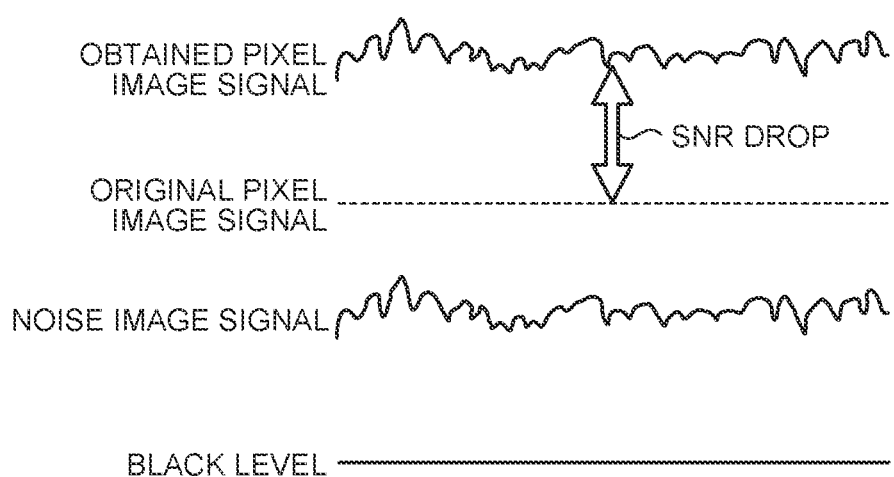
FIG. 5 is a diagram schematically illustrating SNR drop.
Figure 6:
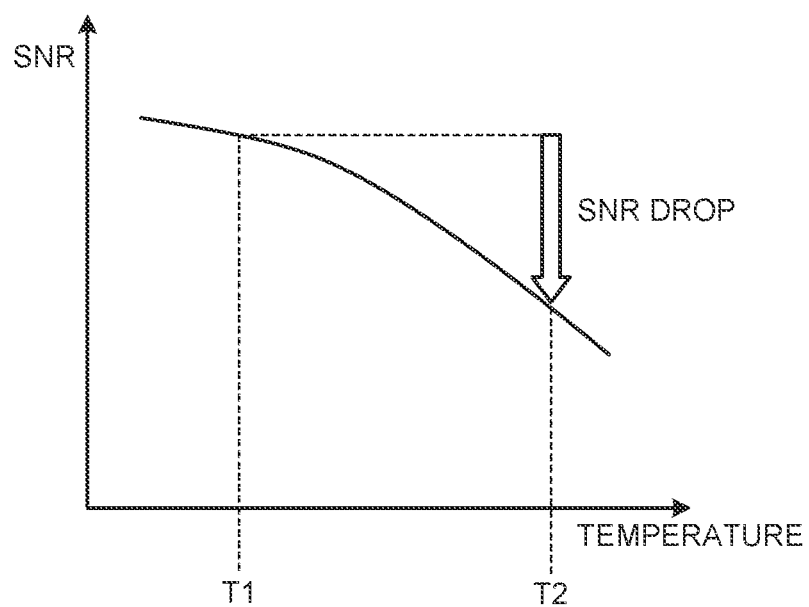
FIG. 6 is a diagram schematically illustrating SNR drop.
Figure 7:
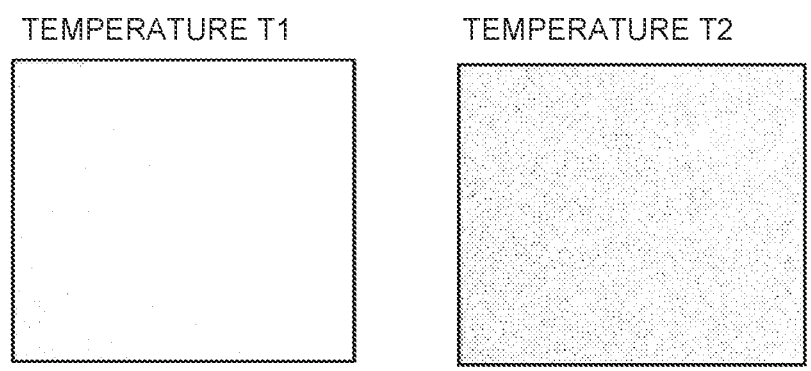
FIG. 7 is a diagram schematically illustrating SNR drop.
Figure 8:
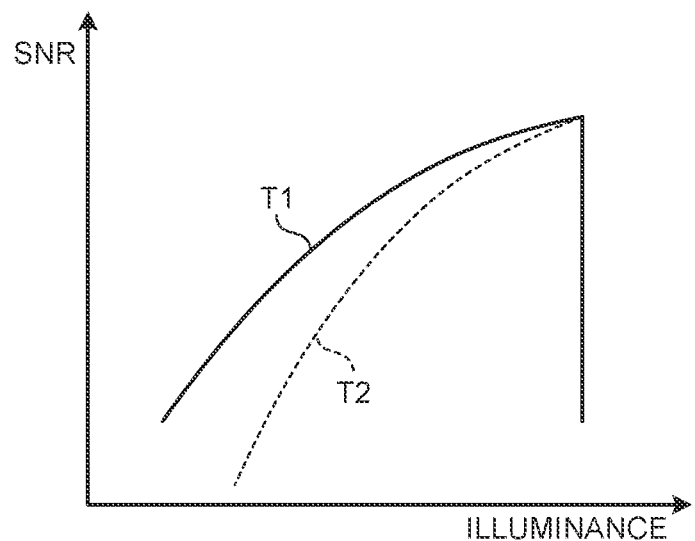
FIG. 8 is a diagram schematically illustrating SNR drop.

FIGS. 5 to 8 are diagrams schematically illustrating SNR drop. FIG. 5 schematically illustrates a level of a pixel image signal (pixel image data) based on the pixel signal level and a level of the noise image signal (noise image data) based on the noise signal level with respect to the black level setting. The level of the pixel image signal is a level obtained by adding the level of the noise image signal (superimposing the noise) to the level of the original pixel image signal. FIG. 6 schematically illustrates a relationship between temperature and SNR. The higher the temperature, the lower the SNR. For example, the SNR at a temperature T2 is lower than the SNR at a temperature T1 (which is a temperature lower than the temperature T2). FIG. 7 schematically illustrates captured images at the temperature T1 and the temperature T2. The captured image at the temperature T2 includes more noise than the captured image at the temperature T1, and thus has lower image quality. FIG. 8 schematically illustrates a relationship between illuminance and SNR. In the low illuminance region in particular, the SNR is lower at the temperature 12 which is higher than the temperature T1, and the influence of the SNR drop becomes apparent.

In the present embodiment, SNR drop is suppressed by subtracting the noise signal level from the pixel signal level. Some specific techniques will be described.

1.4 First Method

The levels in the image appear in patterns unique to the solid-state imaging device 100. That is, the noise signal level of each of the plurality of pixels 110 can be treated as fixed pattern noise FPN. Since the fixed pattern noise FPN is determined in stages such as a design stage and a manufacturing stage of the solid-state imaging device 100, the fixed pattern noise FPN can be acquired in advance as data.

The noise signal level has a correlation with the exposure time. For example, the longer the exposure time, the higher the noise signal level. Furthermore, the noise signal level has a correlation with the temperature of the solid-state imaging device 100, more specifically, the temperature of the pixel array section 101. For example, the higher the temperature, the higher the level of the fixed pattern noise FPN.

Based on the above, in the first method, the noise signal level is calculated based on the actual exposure time and temperature and based on data of the fixed pattern noise FPN, which has been digitized in advance, and then the calculated noise signal level is subtracted from the pixel signal level.

In one embodiment, the subtraction processing is executed inside the solid-state imaging device 100. In that case, the subtraction processing is implemented by cooperative operation of the signal processing section 108, the data storage section 109, and the like as described below, for example.

Figure 9:
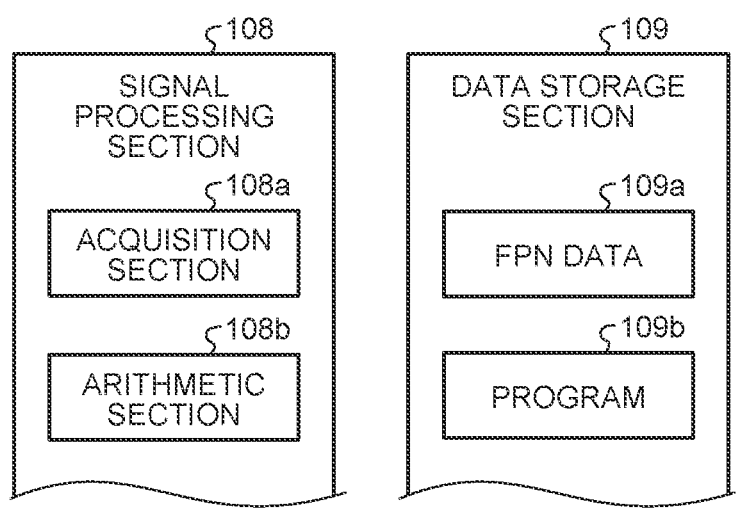
FIG. 9 is a diagram illustrating an example of functional blocks of a signal processing section and a data storage section.

FIG. 9 is a diagram illustrating an example of functional blocks of a signal processing section and a data storage section. For convenience of description, the data storage section 109 and the signal processing section 108 will be described in this order.

The data storage section 109 stores FPN data 109*a* and a program 109*b* in advance as information used for subtraction processing. The FPN data 109*a*, which is data of the fixed pattern noise FPN, is acquired in advance before shipment of the solid-state imaging device 100 and is stored in the data storage section 109, for example. The program 109*b* is a program for causing a computer, more specifically, the signal processing section 108 to execute subtraction processing.

The signal processing section 108 includes an acquisition section 108*a* and an arithmetic section 108*b*. The acquisition section 108*a* acquires the exposure time and the temperature. The exposure time may be a predetermined time, or may be grasped by the system controller 105 and acquired by the acquisition section 108*a*, for example. The temperature is detected by a device such as a temperature sensor (not illustrated), for example, and is acquired by the acquisition section 108*a*. The temperature may be the temperature such as the temperature of the solid-state imaging device 100, or the temperature of the pixel array section 101.

The arithmetic section 108*b* calculates the noise signal level using the exposure time and the temperature acquired by the acquisition section 108*a* and using the FPN data 109*a*. For example, the noise signal level can be calculated by using a given algorithm for calculating the noise signal level based on the exposure time, the temperature, and the FPN data 109*a* or by referring to table data. The arithmetic section 108*b* subtracts the calculated noise signal level from the pixel signal level.

The FPN data 109*a* is data indicating the noise signal level of each of the plurality of pixels 110, and thus can also be treated as noise image data based on the noise signal level (a level of noise image signal). In that case, the arithmetic section 108*b* calculates the noise image data based on the noise signal level using the exposure time, the temperature, and the FPN data 109*a*. The arithmetic section 108*b* subtracts the calculated noise image data from the pixel image data based on the pixel signal level (the level of the pixel image signal).

For example, SNR drop can be suppressed by the subtraction processing as described above.

Figure 10:
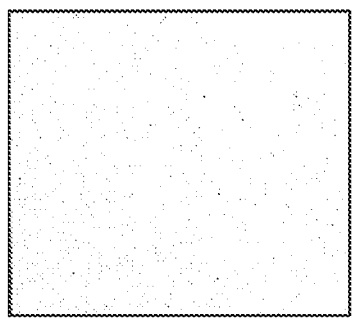
FIG. 10 is a diagram schematically illustrating suppression of SNR drop.

FIG. 10 is a diagram schematically illustrating suppression of SNR drop. The exemplified captured image at the temperature T2 has reduced noise appearing in the image and has improved image quality as compared with the captured image at the temperature T2 illustrated in FIG. 7 described above. As a result, for example, in a case where the solid-state imaging device 100 is installed as a component of the camera 51 on the external recognition sensor 25 of the vehicle 1, the recognition accuracy by the external recognition sensor 25 can be improved.

The subtraction processing may be executed outside the solid-state imaging device 100. For example, an imaging device (for example, the camera 51 in FIG. 1) including the solid-state imaging device 100 may have a function of subtraction processing. Some examples of such an imaging device will be described with reference to FIGS. 11 and 12.

Figure 11:
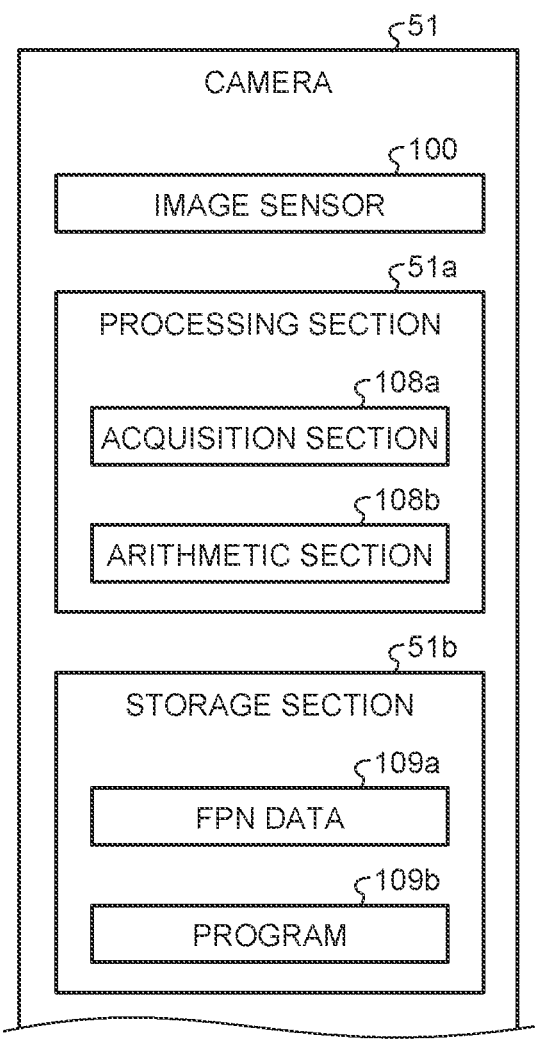
FIG. 11 is a diagram illustrating an example of a schematic configuration of an imaging device.
Figure 12:
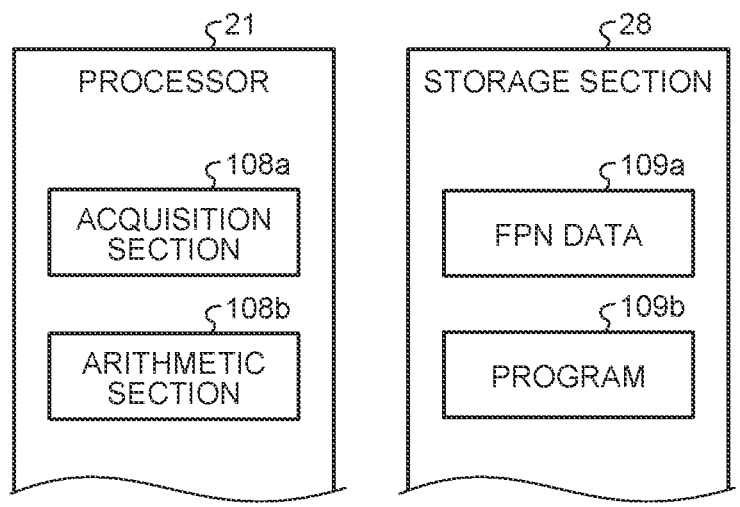
FIG. 12 is a diagram illustrating an example of a schematic configuration of an imaging device.

FIGS. 11 and 12 are diagrams illustrating an example of a schematic configuration of an imaging device. The imaging device in the example of FIG. 11 is the camera 51 described above with reference to FIG. 1. The camera 51 includes the solid-state imaging device 100, a processing section 51*a*, and a storage section 51*b*. The processing section 51*a* includes an acquisition section 108*a* and an arithmetic section 108*b*. The storage section 51*b* stores the FPN data 109*a* and the program 109*b* in advance. Since the acquisition section 108*a*, the arithmetic section 108*b*, the FPN data 109*a*, and the program 109*b* are as described above, the description thereof will not be repeated. Note that the program 109*b* here is a program for causing a computer, more specifically, for example, a processor (not illustrated) installed on the camera 51 to execute processing of the processing section 51*a*.

The functions of the processing section 51*a* (the acquisition section 108*a* and the arithmetic section 108*b*) described above may be provided outside the camera 51. Similarly, the information (the FPN data 109*a* and the program 109*b*) stored in the storage section 51*b* may be stored outside the camera 51. In the example illustrated in FIG. 12, the vehicle control ECU 21 described above with reference to FIG. 1 includes the acquisition section 108*a* and the arithmetic section 108*b*. The recording section 28 stores the FPN data 109*a* and the program 109*b* in advance. That is, the camera 51, the vehicle control ECU 21, and the recording section 28 constitute an imaging device in cooperation. Note that the program 109*b* here is a program for causing a computer, more specifically, the vehicle control ECU 21, to execute processing of the acquisition section 108*a* and the arithmetic section 108*b*.

Figure 13:
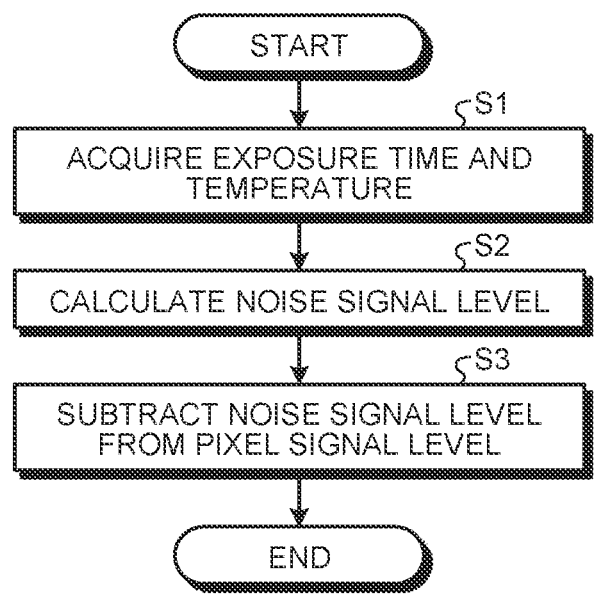
FIG. 13 is a flowchart illustrating an example of processing executed in a solid-state imaging device or an imaging device.

FIG. 13 is a flowchart illustrating an example of processing (processing method in solid-state imaging device and processing method in imaging device) executed in the solid-state imaging device or the imaging device. Since the details of each processing are as described above, the description will not be repeated.

In Step S1, the exposure time and the temperature are acquired. The acquisition section 108*a* acquires the exposure time and the detection temperature. In Step S2, a noise signal level is calculated. The arithmetic section 108*b* calculates the noise signal level using the exposure time and the temperature acquired in the previous Step S1 and the FPN data 109*a*. In Step S3, the noise signal level is subtracted from the pixel signal level. The arithmetic section 108*b* subtracts the noise signal level calculated in the previous Step S2 from the pixel signal level. As described above, the subtraction processing may be processing of subtracting noise image data from pixel image data.

SNR drop is suppressed by the first method as described above, for example.

1.5 Second Method

In the second method, the noise signal level corresponding to the noise actually generated in the capacitor C (the noise signal level based on the generated noise) is subtracted from the pixel signal level.

Figure 14:
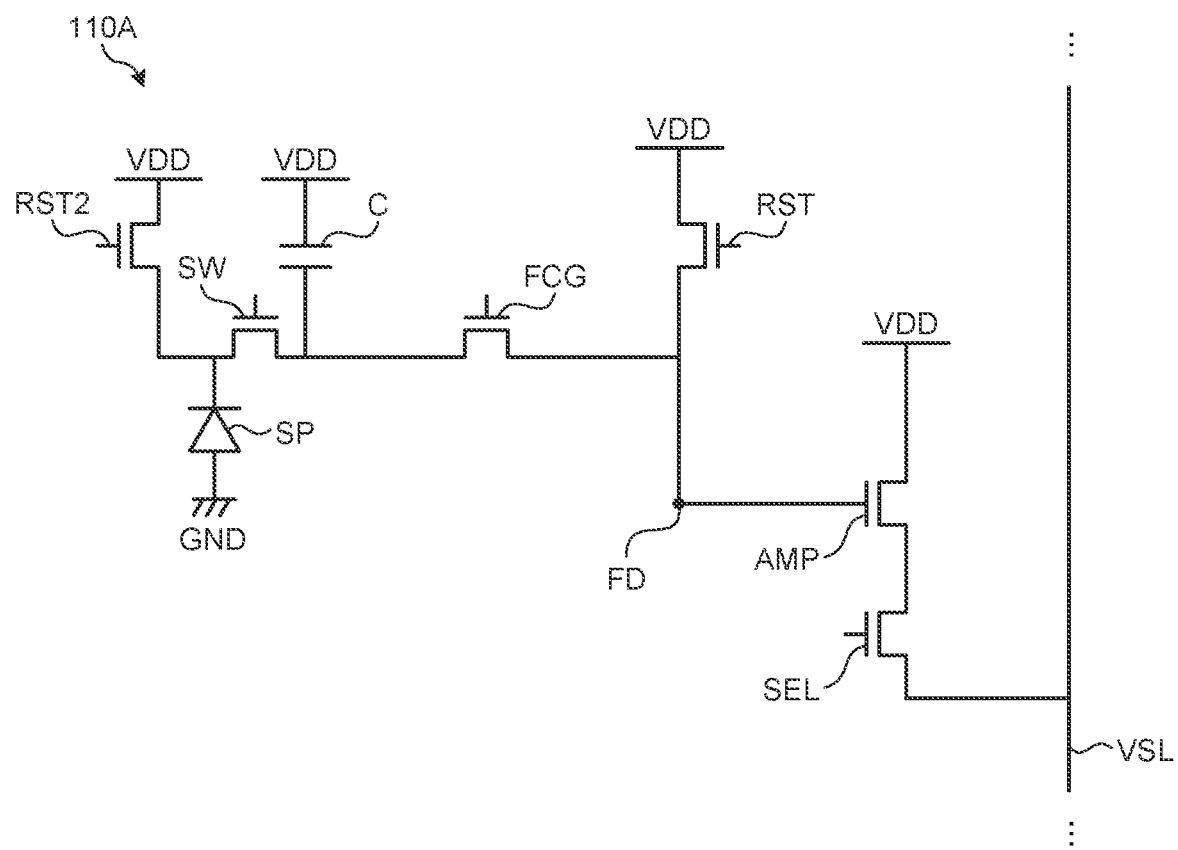
FIG. 14 is a diagram illustrating an example of a schematic configuration of a pixel.

FIG. 14 is a diagram illustrating an example of a schematic configuration of a pixel. A pixel 110A in the example is different from the pixel 110 (FIG. 4) in further including a switch SW and a reset transistor RST2.

The switch SW is a switch transistor connected between the photoelectric conversion section SP and the capacitor C. The ON and OFF states (conductive state and non-conductive state) of the switch SW are controlled by a signal supplied from the vertical drive circuit 102 (FIG. 3) to the gate of the switch SW.

The reset transistor RST2 is connected between the photoelectric conversion section SP and the power supply VDD, and resets the photoelectric conversion section SP. The reset of the photoelectric conversion section SP is controlled by a signal supplied from the vertical drive circuit 102 (FIG. 3) to the gate of the reset transistor RST2.

In the second method, the exposure period includes a light accumulation exposure period and a non-light accumulation exposure period. In the light accumulation exposure period, the switch SW is controlled to be ON or OFF. In the non-light accumulation exposure period, the switch SW is controlled to be OFF. When the switch SW is controlled to be ON in the light accumulation exposure period, a pixel signal level to be obtained in the exposure in the period is a pixel signal level corresponding to the charge generated in the photoelectric conversion section SP and accumulated in the photoelectric conversion section SP and the capacitor C. When the switch SW is controlled to be OFF in the light accumulation exposure period, a signal level to be obtained in the exposure in the period is a signal level corresponding to the charge generated in the photoelectric conversion section SP, spilled (overflowed) from the photoelectric conversion section SP and accumulated in the capacitor C. Such a signal level can also be a pixel signal level. By the exposure in the non-light accumulation exposure period, a noise signal level corresponding to the noise occurring in the capacitor C due to the temperature is obtained. The obtained noise signal level is subtracted from the obtained pixel signal level.

FIG. 15 is a diagram illustrating an example of functional blocks of a signal processing section (or a column processing circuit) and a data storage section.

A signal processing section 108A includes an arithmetic section 108Ab as a functional block related to subtraction processing. The arithmetic section 108Ab subtracts the noise signal level obtained by the exposure in the non-light accumulation exposure period from the pixel signal level obtained by the exposure in the light accumulation exposure period. The arithmetic section 108Ab may subtract the noise signal level that has undergone AD conversion from the pixel signal level that has undergone AD conversion. The arithmetic section 108Ab may subtract the noise image data based on the noise signal level from the pixel image data based on the pixel signal level.

The lengths of the light accumulation exposure period and the non-light accumulation exposure period may be different from each other. For example, the length of the non-light accumulation exposure period may be shorter than the length of the light accumulation exposure period. Examples of the lengths of the light accumulation exposure period and the non-light accumulation exposure period are about 11 msec and about 5.5 msec, respectively, When the length of the light accumulation exposure period and the length of the non-light accumulation exposure period are different from each other, the arithmetic section 108Ab may calculate the noise signal level for the light accumulation exposure period and subtract the calculated noise signal level from the pixel signal level. Specifically, the arithmetic section 108Ab may multiply the noise signal level obtained by the exposure in the non-light accumulation exposure period by (length of the light accumulation exposure period)/(length of the non-light accumulation exposure period), and subtract the noise signal level obtained by multiplication from the pixel signal level.

The subtraction processing may be executed only on some pixels 110, for example, pixels 110 in a low illuminance region. As described above with reference to FIG. 8, this is because the influence of the SNR drop becomes apparent particularly in the low illuminance region. Incidentally, there may be an issue, in the pixel 110 in the high illuminance region, where a part of the charge of the photoelectric conversion section SP leaks to the capacitor C even when the switch SW is turned off, making it difficult to obtain an appropriate noise signal level. However, this issue can be avoided as well.

A program 109Ab of a data storage section 109A is a program for causing a computer, more specifically, the signal processing section 108A to execute processing of the arithmetic section 108Ab.

As selectively exemplified in FIG. 15, a column processing circuit 103A may have the function of the arithmetic section 108Ab. In a case where the column processing circuit 103A executes the subtraction processing, the exposure and the pixel signal level read-out in the light accumulation exposure period and the exposure and noise signal level read-out in the non-light accumulation exposure period may be performed under digital overlap (DOL) driving. In this case, the column processing circuit 103A may perform, for each pixel row, AD conversion on the pixel signal level and the noise signal level, and may subtract, for each pixel row, the noise signal level that has undergone AD conversion from the pixel signal level that has undergone AD conversion. In a case where the exposure period includes the light accumulation exposure period and the non-light accumulation exposure period in this order, the column processing circuit 103A may subtract the noise signal level that has undergone AD conversion from the pixel signal level that has undergone AD conversion and is stored in the line memory. This makes it possible to save the memory capacity required for holding the pixel signal level.

The processing of multiplying the noise signal level obtained by the exposure in the non-light accumulation exposure period described above by (length of light accumulation exposure period)/(length of non-light accumulation exposure period) may also be performed in the column processing circuit 103A. At that time, in order to accelerate the AD conversion processing, AD conversion may be applied exclusively to the lower bits of the noise signal level. This is because the noise signal level is lower than the pixel signal level in most cases. The simplified processing using the bit shift also enables high-speed and small-area operation.

Figure 16A:
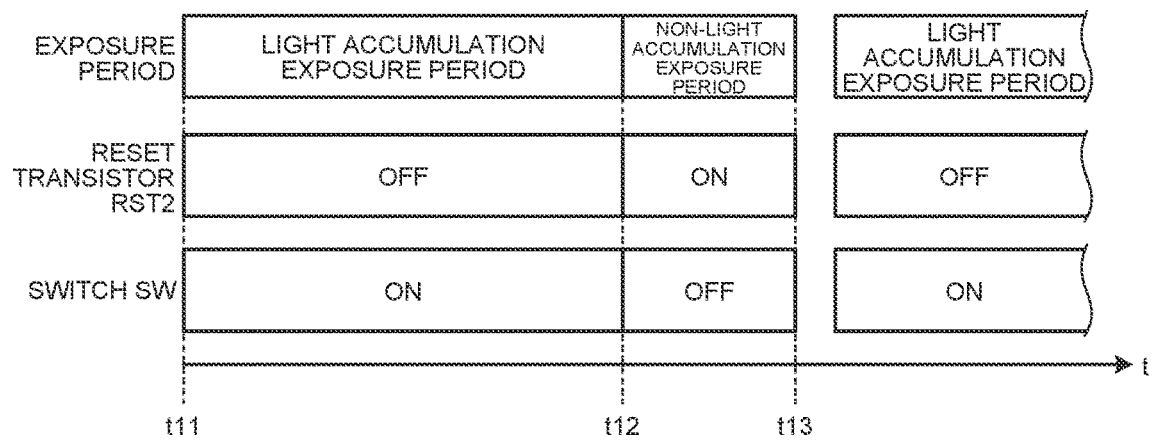
FIGS. 16A and 16B are diagrams schematically illustrating an exposure period.
Figure 16B:
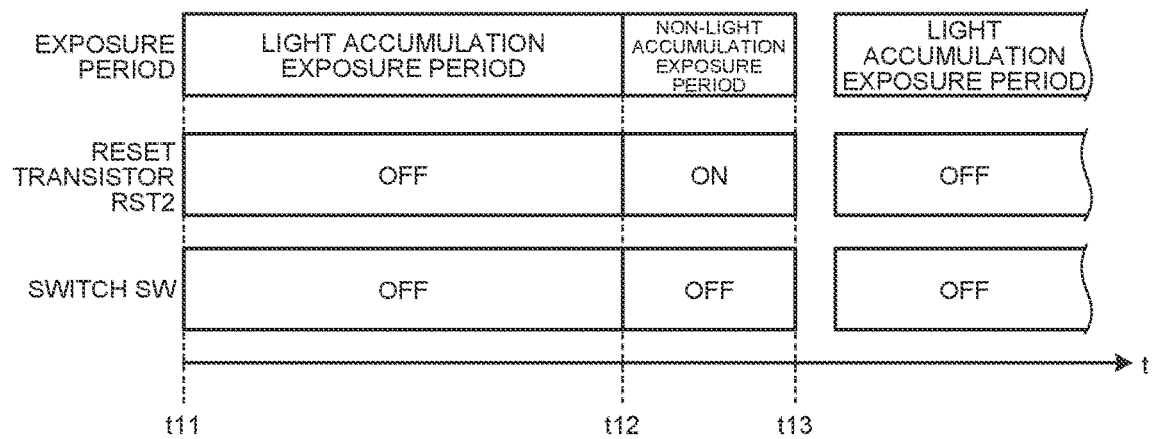

FIGS. 16A and 16B are diagrams schematically illustrating an exposure period. In this example, the exposure period includes the light accumulation exposure period and the non-light accumulation exposure period in this order. It is assumed that the photoelectric conversion section SP and the capacitor C are initially reset. In the example illustrated in FIG. 16A, the switch SW is controlled to be ON in the light accumulation exposure period. In the example illustrated in FIG. 16B, the switch SW is controlled to be OFF in the light accumulation exposure period.

The light accumulation exposure period starts at time t11. The reset transistor RST2 is controlled to be OFF. In the example illustrated in FIG. 16A, the switch SW is controlled to be ON. The photoelectric conversion section SP generates a charge corresponding to the amount of received light. The generated charges are accumulated in the photoelectric conversion section SP and the capacitor C. In the example illustrated in FIG. 16B, the switch SW is controlled to be OFF. Charges generated in the photoelectric conversion section SP and overflowing from the photoelectric conversion section SP are accumulated in the capacitor C.

The light accumulation exposure period ends at time t12. A pixel signal level obtained by the exposure in the light accumulation exposure period undergoes AD conversion.

At the same time t12, the non-light accumulation exposure period starts. The reset transistor RST2 is controlled to be ON. The switch SW is controlled to be OFF. Noise occurs in the capacitor C due to the temperature.

At time t13, the non-light accumulation exposure period ends. A noise signal level obtained by exposure in the non-light accumulation exposure period undergoes AD conversion. Thereafter, the next exposure period starts.

Figure 17:
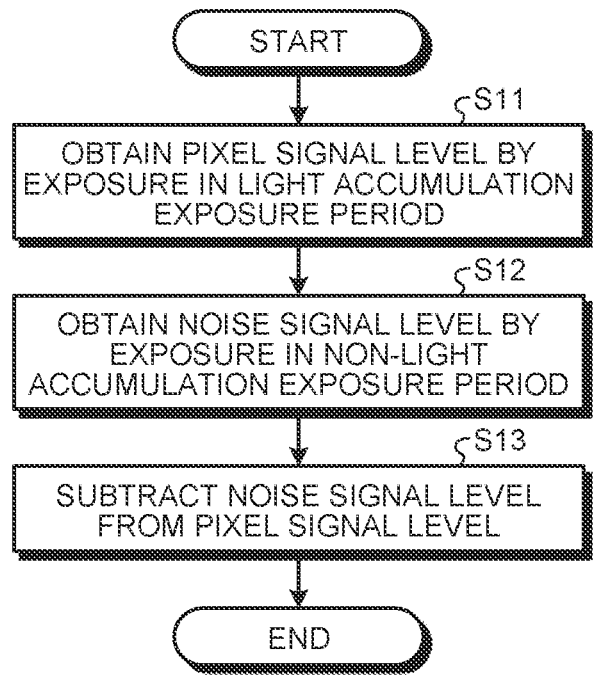
FIG. 17 is a flowchart illustrating an example of processing executed in a solid-state imaging device.

FIG. 17 is a flowchart illustrating an example of processing executed in the solid-state imaging device (processing method in the solid-state imaging device). Since the specific processing is as described above, detailed description will not be repeated here.

In Step S11, the pixel signal level is obtained by the exposure in the light accumulation exposure period. In Step S12, the noise signal level is obtained by the exposure in the non-light accumulation exposure period. In Step S13, the noise signal level is subtracted from the pixel signal level. The arithmetic section 108Ab subtracts the noise signal level obtained in Step S12 from the pixel signal level obtained in Step S11. As described above, the subtraction processing may be processing of subtracting noise image data from pixel image data.

For example, SNR drop is also suppressed by the second method as described above.

As a further measure against saturation, it is also allowable to release the charge by the reset transistor RST2.

The configuration of the pixel 110A and the above-described first method may be combined with each other. For example, by controlling the reset transistor RST2 to be ON and controlling the switch SW to be OFF, the FPN data 109a can be acquired. The subtraction processing using the FPN data 109a is as described above.

Since the subtraction processing is subtraction of the fixed pattern noise FPN, noise is appropriately reduced and SNR drop is suppressed even in a case where Motion-Compensated Temporal filtering (MCTF) is performed on frame image data.

1.6 Third Method

A third method is a method by which the noise signal level is subtracted from the pixel signal level in a simpler method than the second method in some aspects.

Figure 18:
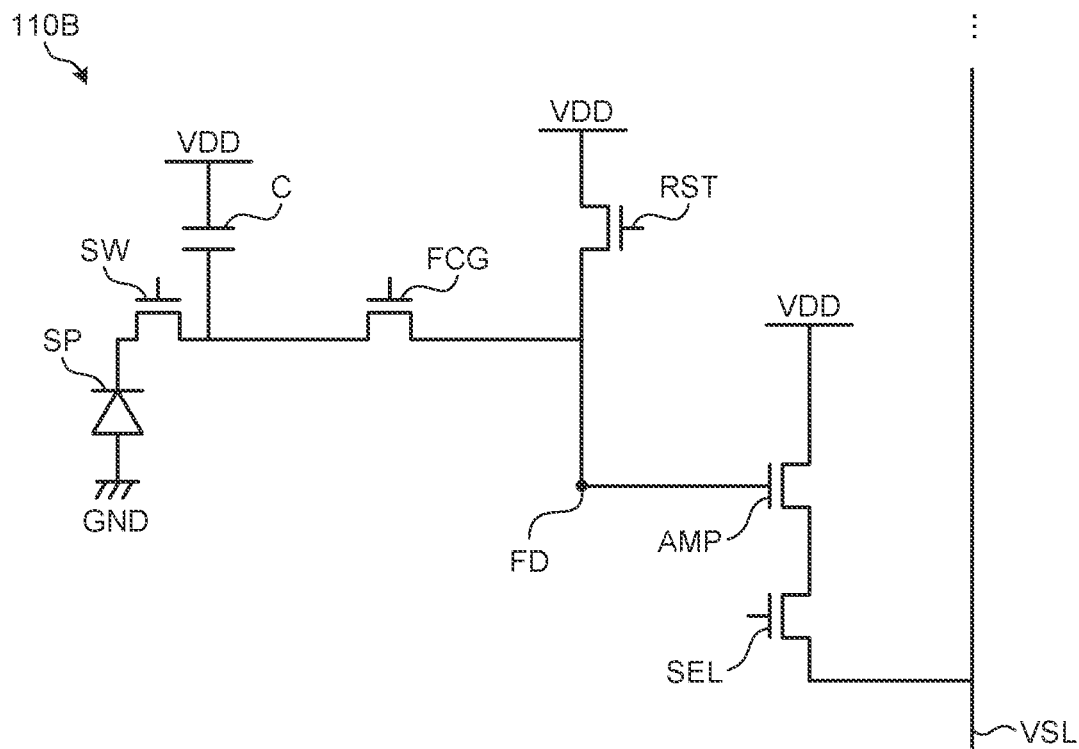
FIG. 18 is a diagram illustrating an example of a schematic configuration of a pixel.

FIG. 18 is a diagram illustrating an example of a schematic configuration of a pixel. A pixel 110B in the example is different from the pixel 110A (FIG. 14) in that the reset transistor RST2 is not included.

In the third method, the exposure period includes a first period and a second period in this order. In the first period, the switch SW is controlled to be OFF. In the second period, the switch SW is controlled to be ON. By the exposure in the first period, a noise signal level corresponding to the noise occurring in the capacitor C due to the temperature is obtained. The pixel signal level to be obtained by the exposure in a total period of the first period and the second period is a pixel signal level corresponding to the charge generated in the photoelectric conversion section SP and accumulated in the photoelectric conversion section SP and the capacitor C. The obtained noise signal level is subtracted from the obtained pixel signal level.

FIG. 19 is a diagram illustrating an example of functional blocks of a signal processing section (or a column processing circuit) and a data storage section. A signal processing section 108B includes an arithmetic section 108Bb as a functional block related to subtraction processing. The arithmetic section 108Bb calculates the noise signal level for the total period of the first period and the second period based on the noise signal level obtained by the exposure in the first period, and subtracts the calculated noise signal level from the pixel signal level obtained by the exposure in the total period. Specifically, the arithmetic section 108Bb multiplies the noise signal level obtained by the exposure in the first period by (the length of the total period)/(the length of the first period), and subtracts the noise signal level obtained by multiplication from the pixel signal level.

Similarly to the arithmetic section 108Ab (FIG. 15) described above, the arithmetic section 108Bb may subtract the noise signal level that has undergone AD conversion from the pixel signal level that has undergone AD conversion.

Furthermore, the arithmetic section 108Bb may subtract noise image data based on the noise signal level from pixel image data based on the pixel signal level.

The data storage section 109B stores a program 109Bb as information regarding the noise cancellation processing. The program 109Bb is a program for causing a computer, more specifically, the signal processing section 108B to execute processing of the arithmetic section 108Bb.

As selectively exemplified in FIG. 19, a column processing circuit 103B may have the function of the arithmetic section 108Bb.

Figure 20:
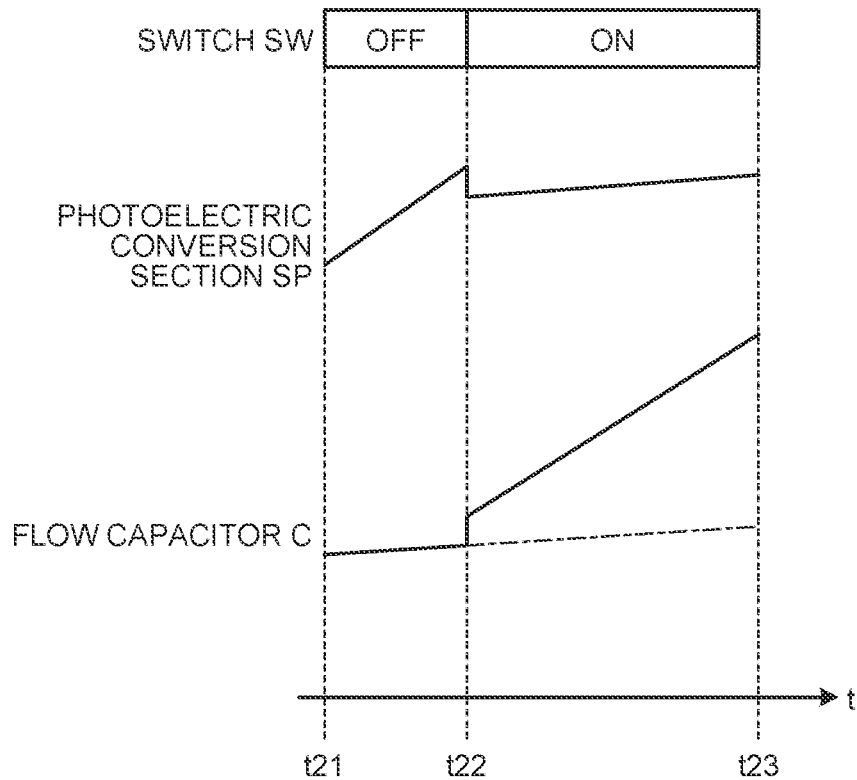
FIG. 20 is a diagram schematically illustrating an exposure period.

FIG. 20 is a diagram schematically illustrating an exposure period. The charge amounts of the photoelectric conversion section SP and the capacitor C are schematically indicated by solid lines. It is assumed that the photoelectric conversion section SP and the capacitor C are initially reset.

The first period starts at time t21. The switch SW is controlled to be OFF. The photoelectric conversion section SP generates a charge corresponding to the amount of received light. The generated charge is accumulated in the photoelectric conversion section SP. On the other hand, noise occurs in the capacitor C due to the temperature.

The first period ends at time t22. The noise signal level obtained by the exposure in the first period undergoes AD conversion.

At the same time t22, the second period starts. The switch SW is controlled to be ON. The charges generated and accumulated in the photoelectric conversion section SP so far are also accumulated in the capacitor C. The photoelectric conversion section SP continuously generates a charge. The generated charges are accumulated in the photoelectric conversion section SP and the capacitor C.

Note that the length of the first period (time t21 to time t22) is set to end before saturation of charge accumulation in the photoelectric conversion section SP. The length of the first period may be a predetermined length based on data such as design data and experimental data, for example. The length of the first period may be fixed, or may be dynamically set according to conditions such as illuminance at the time of exposure, for example.

The second period ends at time t23. A pixel signal level obtained by exposure in a total period of the first period and the second period undergo AD conversion. Although not illustrated in FIG. 20, the next exposure period starts thereafter.

As described above, the arithmetic section 108Bb multiplies the noise signal level obtained by the exposure in the first period by (the length of the total period)/(the first period) to calculate the noise signal level for the total period. The calculated noise signal level is a noise signal level at time t23 when the noise signal level in the first period (time t21 to time t22) is assumed to be extended to time t23 as indicated by one-dot chain line in FIG. 20. The arithmetic section 108Bb subtracts the calculated noise signal level from the pixel signal level.

Figure 21:
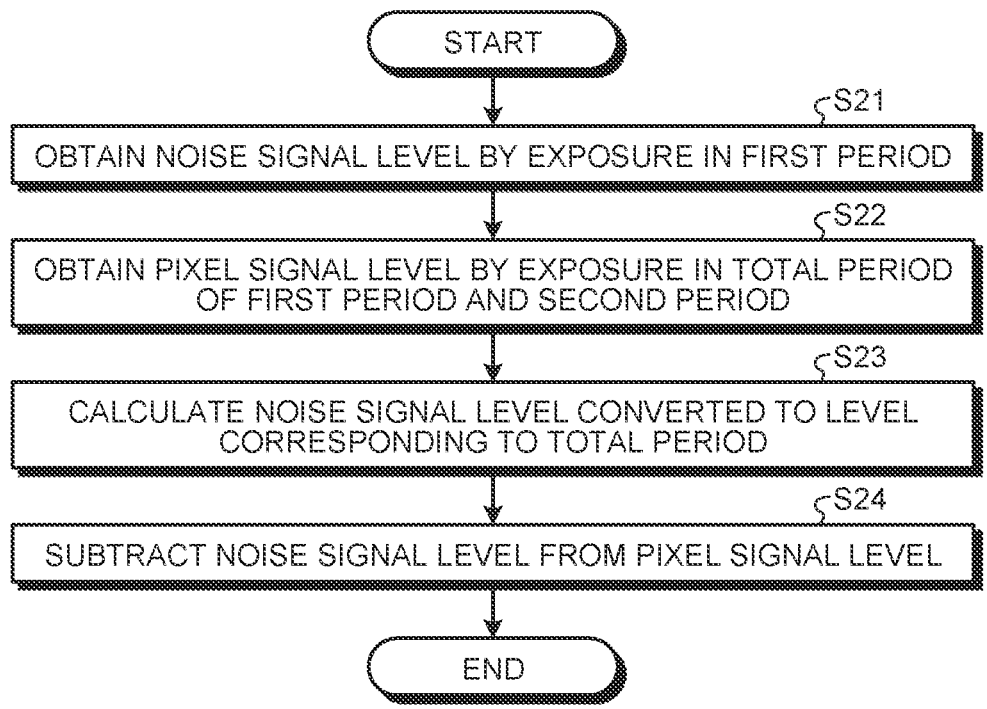
FIG. 21 is a flowchart illustrating an example of processing executed in a solid-state imaging device.

FIG. 21 is a flowchart illustrating an example of processing executed in the solid-state imaging device (processing method in the solid-state imaging device). Since the specific processing is as described above, detailed description will not be repeated here.

In Step S21, the noise signal level due to the exposure in the first period is obtained. In Step S22, a pixel signal level by exposure in the total period of the first period and the second period is obtained. In Step S23, the noise signal level converted into the total period is calculated. The arithmetic section 108Bb multiplies the noise signal level obtained in the previous Step S21 by (the length of the total period)/(the length of the first period). In Step S24, the noise signal level is subtracted from the pixel signal level. The arithmetic section 108Bb subtracts the noise signal level calculated in Step S23 from the pixel signal level obtained in Step S22. As described above, the subtraction processing may be processing of subtracting noise image data from pixel image data.

For example, the SNR drop is also suppressed by the third method as described above. According to the third method, it is sufficient to read the reset level (time t21 in FIG. 20) once. For example, there is no need to perform readout of the reset level twice as in the second method (time t11 and time t12 in FIGS. 16A and 16B), making it possible to simplify the processing correspondingly.

2. Modification

Although one embodiment of the present disclosure has been described above, the disclosed technology is not limited to the above embodiment. Some modifications will be described.

The above embodiment has described an example in which one pixel 110 includes one photoelectric conversion section SP. Alternatively, one pixel 110 may include a plurality of photoelectric conversion sections SP. In this case, the pixel circuit may be partially shared among the plurality of photoelectric conversion sections SP.

Figure 22:
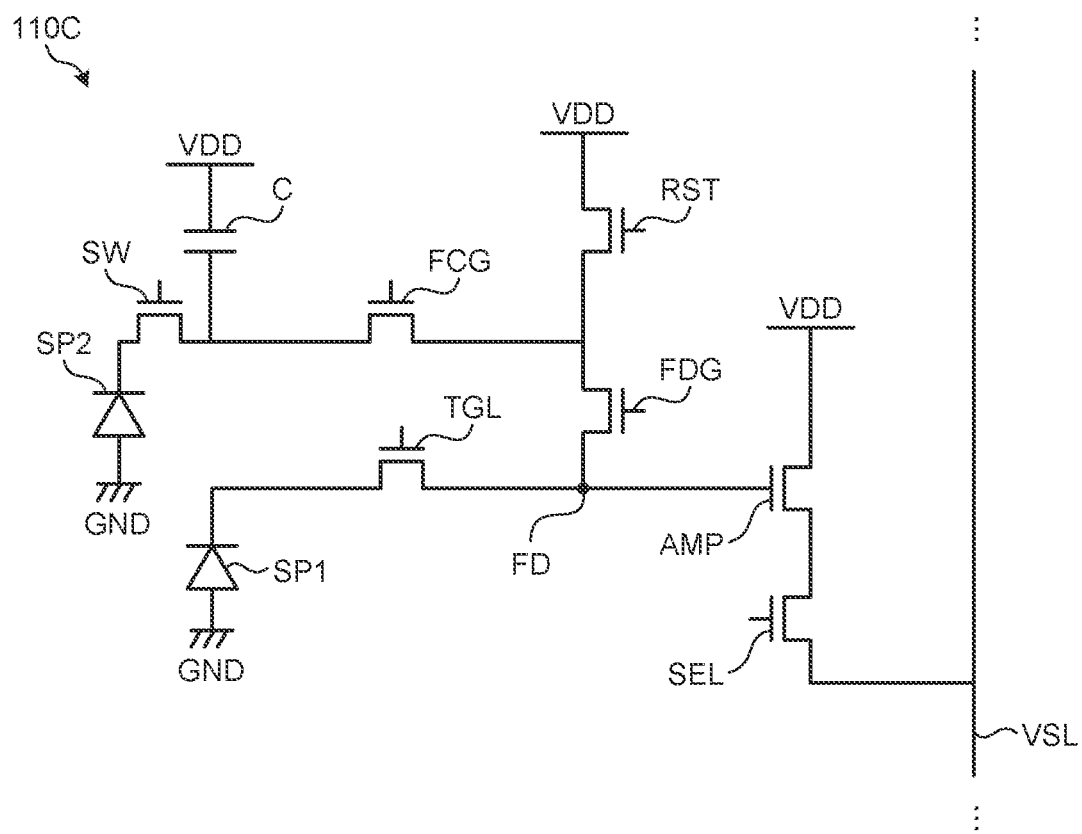
FIG. 22 is a diagram illustrating an example of a schematic configuration of a pixel.

FIG. 22 is a diagram illustrating an example of a schematic configuration of a pixel. The photoelectric conversion section SP described above is illustrated as a photoelectric conversion section SP2. A pixel 110C in the example is different from the pixel 110B (FIG. 18) in further including a photoelectric conversion section SP1, a transfer transistor TGL, and a transfer transistor FDG.

The photoelectric conversion section SP1 generates and accumulates charges according to the amount of received light. In this example, the photoelectric conversion section SP1 is also a photodiode similarly to the photoelectric conversion section SP2. The anode of the photoelectric conversion section SP1 is connected to the ground GND. The cathode is connected to the transfer transistor TGL. No capacitor is connected to the photoelectric conversion section SP1. The photoelectric conversion section SP1 has saturation characteristics different from those of the photoelectric conversion section SP2 or the capacitor C.

The transfer transistor TGL is connected between the photoelectric conversion section SP1 and the floating diffusion FD, and transfers the charge accumulated in the photoelectric conversion section SP1 to the floating diffusion FD. The transfer of the charge is controlled by a signal supplied from the vertical drive circuit 102 (FIG. 3) to the gate of the transfer transistor TGL.

The transfer transistor FDG is connected between the transfer transistor FCG and the floating diffusion FD, and transfers the charges accumulated in the photoelectric conversion section SP2 and the capacitor C to the floating diffusion FD in cooperation with the transfer transistor FCG. The transfer of the charge is controlled by a signal supplied from the vertical drive circuit 102 (FIG. 3) to the gate of the transfer transistor FCG and the gate of the transfer transistor FDG.

In the pixel 110C, the charge accumulated in the photoelectric conversion section SP2 and/or the capacitor C and the charge accumulated in the photoelectric conversion section SP1 are transferred to the floating diffusion FD at different timings, and corresponding signals are read out. The exposure times of the photoelectric conversion section SP2 and the photoelectric conversion section SP1 may be individually set. For example, with a reduced capacitance of the photoelectric conversion section SP1 or a reduced exposure period, the sensitivity at low illuminance can be improved as compared with the photoelectric conversion section SP2 and the capacitor C. By using signals obtained by the photoelectric conversion section SP2 and the photoelectric conversion section SP1 having different saturation characteristics in combination, it is possible to further enhance the WDR.

The pixel 110 (FIG. 4) and the pixel 110A (FIG. 14) described above may also be modified so as to include the photoelectric conversion section SP1. Furthermore, one pixel 110 may include three or more photoelectric conversion sections having mutually different saturation characteristics.

In the above embodiment, the camera 51 of the vehicle 1 has been described as an example of application of the solid-state imaging device 100. Note that the solid-state imaging device 100 may be used for various purposes other than this. Examples of other applications include a mobile body such as a robot and an IOT device.

3. Exemplary Effects

The embodiment described above is specified as follows, for example. As described with reference to FIGS. 3, 4, 9, 12 to 15, 17 to 19, 21, 22, and the like, the solid-state imaging device 100 includes the plurality of pixels 110 and the like, and the arithmetic section 108b and the like. Each of the plurality of pixels 110 and the like includes: the photoelectric conversion section SP that generates a charge according to the amount of received light; and the capacitor C provided to share accumulation of the charge generated in the photoelectric conversion section SP with the photoelectric conversion section SP. The arithmetic section 108b and the like subtract the noise signal level corresponding to the noise occurring in the capacitor C due to the temperature from the pixel signal level corresponding to the charge generated in the photoelectric conversion section SP and accumulated in the photoelectric conversion section SP and the capacitor C (Steps S3, S13, and S24).

According to the solid-state imaging device 100 described above, since the charge generated in the photoelectric conversion section SP is accumulated not only in the photoelectric conversion section SP but also in the capacitor C, it is possible to suppress the saturation of the charge and achieve the WDR. Furthermore, since the noise signal level corresponding to the noise occurring in the capacitor C due to the temperature is subtracted from the pixel signal level, it is also possible to suppress the SNR drop. This makes it possible to suppress the SNR drop while achieving WDR.

As described with reference to FIGS. 9, 13, and the like, the solid-state imaging device 100 may include the storage section (data storage section 109) that stores fixed pattern noise data (FPN data 109a) indicating the noise signal level of each of the plurality of pixels 110, and the arithmetic section 108b may calculate the noise signal level using the exposure time, the temperature, and the fixed pattern noise data (FPN data 109a) stored in the storage section (data storage section 109) (Step S2), and may subtract the calculated noise signal level from the pixel signal level (Step S3). For example, SNR drop can be suppressed by the subtraction processing (first method) like this.

As described with reference to FIG. 9 and the like, the fixed pattern noise data (FPN data 109a) is noise image data based on the noise signal level of each of the plurality of pixels 110, and the arithmetic section 108b may calculate the noise image data based on the noise signal level using the exposure time, the temperature, and the fixed pattern noise data (FPN data 109a) stored in the storage section (data storage section 109), and may subtract the calculated noise image data from the pixel image data based on the pixel signal level. In this manner, the subtraction processing can be executed at the image data level.

As described with reference to FIGS. 14, 15, 16A, 16B, and 17 and the like, each of the plurality of pixels 110A may include the switch SW connected between the photoelectric conversion section SP and the capacitor C; the exposure period of the plurality of pixels 110A may include the light accumulation exposure period (time t11 to time t12) in which the switch SW is controlled to the conductive state (ON) or the non-conductive state (OFF) and the non-light accumulation exposure period (time t12 to time t13) in which the switch SW is controlled to the non-conductive state (OFF); the arithmetic section 108Ab may subtract the noise signal level obtained by the exposure in the non-light accumulation exposure period (time t12 to time t13) from the pixel signal level obtained by the exposure in the light accumulation exposure period (time t11 to time t12) (Steps S11 to S13); and the arithmetic section 108Ab may subtract the noise signal level that has undergone AD conversion from the pixel signal level that has undergone AD conversion. For example, SNR drop can also be suppressed by the subtraction processing (second method) like this.

As described with reference to FIG. 15 and the like, the arithmetic section 108Ab may calculate the noise signal level for the light accumulation exposure period (time t11 to time t12) based on the noise signal level obtained by the exposure in the non-light accumulation exposure period (time t12 to time t13), and may subtract the calculated noise signal level from the pixel signal level obtained by the exposure in the light accumulation exposure period (time t11 to time t12). With this configuration, even in a case where the length of the light accumulation exposure period (time t11 to time t12) is different from the length of the non-light accumulation exposure period (time t12 to time t13), it is possible to execute appropriate subtraction processing.

As described with reference to FIG. 15 and the like, the arithmetic section 108Ab may subtract the noise image data based on the noise signal level from the pixel image data based on the pixel signal level. In this manner, the subtraction processing can be executed at the image data level.

As described with reference to FIGS. 3 and 15 and the like, the plurality of pixels 110A may be arranged in an array, the pixel signal level and the noise signal level may undergo AD conversion for each pixel row, and the arithmetic section 108Ab may subtract, for each pixel row, the noise signal level that has undergone AD conversion from the pixel signal level that has undergone AD conversion. Such DOL driving can save the memory capacity required for holding the pixel signal level.

As described with reference to FIGS. 18 to 21 and the like, each of the plurality of pixels 110B may include the switch SW connected between the photoelectric conversion section SP and the capacitor C, the exposure period of the plurality of pixels 110B may include the first period (time t21 to time t22) in which the switch SW is controlled to the non-conductive state (OFF) and the second period (time t22 to time t23) in which the switch SW is controlled to the conductive state (ON) in this order, and the arithmetic section 108Bb may calculate the noise signal level for the total period (time t21 to time t23) of the first period (time t21 to time t22) and the second period (time t22 to time t23) based on the noise signal level obtained by the exposure in the first period (time t21 to time t22) and may subtract the calculated noise signal level from the pixel signal level obtained by the exposure in the total period (time t21 to time t23). For example, SNR drop can also be suppressed by the subtraction processing (third method) like this.

The imaging device (such as the camera 51) described with reference to FIGS. 1, 3, 4, 11, 12, and the like is also one of the embodiments. The imaging device (such as the camera 51) includes the solid-state imaging device 100 and the arithmetic section 108b. The solid-state imaging device 100 includes a plurality of pixels 110, each of the plurality of pixels 110 including: the photoelectric conversion section SP that generates a charge according to the amount of received light; and the capacitor C provided so as to be able to share accumulation of the charge generated in the photoelectric conversion section SP with the photoelectric conversion section SP. The arithmetic section 108b subtracts the noise signal level according to noise occurring in the capacitor C due to temperature from a pixel signal level according to the charge generated in the photoelectric conversion section SP and accumulated in the photoelectric conversion section SP and the capacitor C. Also with such an imaging device (such as the camera 51), it is possible to suppress the SNR drop while achieving the WDR as described above.

As described with reference to FIGS. 11 to 13 and the like, the imaging device (such as the camera 51) may include the storage section (such as the storage section 51b) that stores in advance the fixed pattern noise data (the FPN data 109a) indicating the noise signal level of each of the plurality of pixels 110, and the arithmetic section 108b may calculate the noise signal level using the exposure time, the temperature, and the fixed pattern noise data (the FPN data 109a) stored in the storage section (such as the storage section 51b), and may subtract the calculated noise signal level from the pixel signal level. For example, SNR drop can be suppressed by the subtraction processing (first method) like this.

As described with reference to FIGS. 11, 12, and the like, the fixed pattern noise data (FPN data 109a) is noise image data based on the noise signal level of each of the plurality of pixels 110, and the arithmetic section 108b may calculate the noise image data based on the noise signal level using the exposure time, the temperature, and the fixed pattern noise data (FPN data 109a) stored in the storage section (such as the camera 51), and may subtract the calculated noise image data from the pixel image data based on the pixel signal level. In this manner, the subtraction processing can be executed at the image data level.

The processing method in the solid-state imaging device 100 described with reference to FIGS. 3, 4, 13, 14, 17, 18, 21, 22, and the like is also one of the embodiments. In the processing method in the solid-state imaging device 100, the solid-state imaging device 100 includes a plurality of pixels 110 and the like, each of the pixels 110 including: a photoelectric conversion section SP that generates a charge according to the amount of received light; and a capacitor C provided so as to be able to share accumulation of the charge generated in the photoelectric conversion section SP with the photoelectric conversion section SP. The processing method includes subtracting a noise signal level according to noise occurring in the capacitor C due to temperature from a pixel signal level according to the charge generated in the photoelectric conversion section SP and accumulated in the photoelectric conversion section SP and the capacitor C (Steps S3, S13, and S24). Also with such a processing method in the solid-state imaging device 100, it is possible to suppress the SNR drop while achieving the WDR as described above.

The processing program (such as the program 109b) in the solid-state imaging device 100 described with reference to FIGS. 3, 4, 9, 12 to 15, 17 to 19, 21, 22, and the like is also one of the embodiments. In the processing program in the solid-state imaging device 100 (such as the program 109b), the solid-state imaging device 100 includes a plurality of pixels 110 and the like, each of the pixels 110 including: a photoelectric conversion section SP that generates a charge according to the amount of received light; and a capacitor C provided so as to be able to share accumulation of the charge generated in the photoelectric conversion section SP with the photoelectric conversion section SP. The processing program (such as the program 109b) causes a computer to execute subtraction of a noise signal level according to noise occurring in the capacitor C due to temperature from a pixel signal level according to the charge generated in the photoelectric conversion section SP and accumulated in the photoelectric conversion section SP and the capacitor C (Steps S3, S13, and S24). Also with such a processing program (such as the program 109b) in the solid-state imaging device 100, it is possible to suppress the SNR drop while achieving the WDR as described above.

The processing method in the imaging device (such as the camera 51) described with reference to FIGS. 1, 3, 4, 13, and the like is also one of the embodiments. In the processing method in the imaging device (such as the camera 51), the imaging device (such as the camera 51) includes the solid-state imaging device 100. The solid-state imaging device 100 includes a plurality of pixels 110, each of the plurality of pixels 110 including: the photoelectric conversion section SP that generates a charge according to the amount of received light; and the capacitor C provided so as to be able to share accumulation of the charge generated in the photoelectric conversion section SP with the photoelectric conversion section SP. The processing method includes subtraction (Step S3) of the noise signal level according to noise occurring in the capacitor C due to temperature from a pixel signal level according to the charge generated in the photoelectric conversion section SP and accumulated in the photoelectric conversion section SP and the capacitor C. Also with such a processing method of an imaging device (such as the camera 51), it is possible to suppress the SNR drop while achieving the WDR as described above.

The processing program (program 109b) in the imaging device (such as the camera 51) described with reference to FIGS. 1, 3, 4, 11 to 13, and the like is also one of the embodiments. In the processing program (the program 109b) in the imaging device (such as the camera 51), the imaging device (such as the camera 51) includes the solid-state imaging device 100. The solid-state imaging device 100 includes a plurality of pixels 110, each of the plurality of pixels 110 including: the photoelectric conversion section SP that generates a charge according to the amount of received light; and the capacitor C provided so as to be able to share accumulation of the charge generated in the photoelectric conversion section SP with the photoelectric conversion section SP. The processing program (the program 109b) causes a computer to execute subtraction (Step S3) of the noise signal level according to noise occurring in the capacitor C due to temperature from a pixel signal level according to the charge generated in the photoelectric conversion section SP and accumulated in the photoelectric conversion section SP and the capacitor C. Also with such a processing program (such as the program 109b) in the imaging device (such as the camera 51), it is possible to suppress the SNR drop while achieving the WDR as described above.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technique can also have the following configurations.

(1) A solid-state imaging device comprising:
a plurality of pixels; and
an arithmetic section,
each of the plurality of pixels including: a photoelectric conversion section that generates a charge according to an amount of received light; and a capacitor provided so as to be able to share accumulation of the charge generated in the photoelectric conversion section with the photoelectric conversion section,
the arithmetic section being provided to subtract a noise signal level according to noise occurring in the capacitor due to temperature from a pixel signal level according to the charge generated in the photoelectric conversion section and accumulated in the photoelectric conversion section and the capacitor.

(2) The solid-state imaging device according to (1), further comprising
a storage section that stores in advance fixed pattern noise data indicating the noise signal level of each of the plurality of pixels,
wherein the arithmetic section calculates the noise signal level by using an exposure time, a temperature, and the fixed pattern noise data stored in the storage section, and subtracts the calculated noise signal level from the pixel signal level.

(3) The solid-state imaging device according to (2),
wherein the fixed pattern noise data is noise image data based on the noise signal level of each of the plurality of pixels, and
the arithmetic section calculates the noise image data based on the noise signal level by using the exposure time, the temperature, and the fixed pattern noise data stored in the storage section, and subtracts the calculated noise image data from pixel image data based on the pixel signal level.

(4) The solid-state imaging device according to (1),
wherein each of the plurality of pixels includes a switch connected between the photoelectric conversion section and the capacitor,
an exposure period of the plurality of pixels includes:
a light accumulation exposure period in which the switch is controlled to a conductive state or a non-conductive state; and
a non-light accumulation exposure period in which the switch is controlled to a non-conductive state,
the arithmetic section subtracts the noise signal level obtained by the exposure in the non-light accumulation exposure period from the pixel signal level obtained by the exposure in the light accumulation exposure period, and
the arithmetic section subtracts the noise signal level that has undergone AD conversion from the pixel signal level that has undergone AD conversion.

(5) The solid-state imaging device according to (4),
wherein the arithmetic section calculates the noise signal level corresponding to the light accumulation exposure period based on the noise signal level obtained by the exposure in the non-light accumulation exposure period, and subtracts the calculated noise signal level from the pixel signal level obtained by the exposure in the light accumulation exposure period.

(6) The solid-state imaging device according to (4) or (5),
wherein the arithmetic section subtracts noise image data based on the noise signal level from pixel image data based on the pixel signal level.

(7) The solid-state imaging device according to (4) or (5),
wherein the plurality of pixels is arranged in an array,
the pixel signal level and the noise signal level undergo AD conversion for each pixel row, and
the arithmetic section subtracts, for each pixel row, the noise signal level that has undergone AD conversion from the pixel signal level that has undergone AD conversion.

(8) The solid-state imaging device according to (1),
wherein each of the plurality of pixels includes a switch connected between the photoelectric conversion section and the capacitor,
an exposure period of the plurality of pixels includes:
a first period in which the switch is controlled to a non-conductive state; and
a second period in which the switch is controlled to a conductive state, with the second period coming after the first period, and
the arithmetic section calculates the noise signal level corresponding to a total period of the first period and the second period based on the noise signal level obtained by the exposure in the first period, and subtracts the calculated noise signal level from the pixel signal level obtained by the exposure in the total period.

(9) An imaging device comprising:
a solid-state imaging device; and
an arithmetic section,
the solid-state imaging device including a plurality of pixels, each of the plurality of pixels including: a photoelectric conversion section that generates a charge according to an amount of received light; and a capacitor provided so as to be able to share accumulation of the charge generated in the photoelectric conversion section with the photoelectric conversion section,
the arithmetic section being provided to subtract a noise signal level according to noise occurring in the capacitor due to temperature from a pixel signal level according to the charge generated in the photoelectric conversion section and accumulated in the photoelectric conversion section and the capacitor.

(10) The imaging device according to (9), further comprising
a storage section that stores in advance fixed pattern noise data indicating the noise signal level of each of the plurality of pixels,
wherein the arithmetic section calculates the noise signal level by using an exposure time, a temperature, and the fixed pattern noise data stored in the storage section, and subtracts the calculated noise signal level from the pixel signal level.

(11) The imaging device according to (10),
wherein the fixed pattern noise data is noise image data based on the noise signal level of each of the plurality of pixels, and
the arithmetic section calculates the noise image data based on the noise signal level by using the exposure time, the temperature, and the fixed pattern noise data stored in the storage section, and subtracts the calculated noise image data from pixel image data based on the pixel signal level.

(12) A processing method in a solid-state imaging device,
the solid-state imaging device including a plurality of pixels, each of the plurality of pixels including: a photoelectric conversion section that generates a charge according to an amount of received light; and a capacitor provided so as to be able to share accumulation of the charge generated in the photoelectric conversion section with the photoelectric conversion section,
the processing method comprising subtracting a noise signal level according to noise occurring in the capacitor due to temperature from a pixel signal level according to the charge generated in the photoelectric conversion section and accumulated in the photoelectric conversion section and the capacitor.

(13) A processing program in a solid-state imaging device,
the solid-state imaging device including a plurality of pixels, each of the plurality of pixels including: a photoelectric conversion section that generates a charge according to an amount of received light; and a capacitor provided so as to be able to share accumulation of the charge generated in the photoelectric conversion section with the photoelectric conversion section,
the processing program being provided to cause a computer to execute subtraction of a noise signal level according to noise occurring in the capacitor due to temperature from a pixel signal level according to the charge generated in the photoelectric conversion section and accumulated in the photoelectric conversion section and the capacitor.

(14) A processing method in an imaging device,
the imaging device including a solid-state imaging device, the solid-state imaging device including a plurality of pixels, each of the plurality of pixels including: a photoelectric conversion section that generates a charge according to an amount of received light; and a capacitor provided so as to be able to share accumulation of the charge generated in the photoelectric conversion section with the photoelectric conversion section,
the processing method comprising subtracting a noise signal level according to noise occurring in the capacitor due to temperature from a pixel signal level according to the charge generated in the photoelectric conversion section and accumulated in the photoelectric conversion section and the capacitor.

(15) A processing program in an imaging device,
the imaging device including a solid-state imaging device, the solid-state imaging device including a plurality of pixels, each of the plurality of pixels including: a photoelectric conversion section that generates a charge according to an amount of received light and including a capacitor provided so as to be able to share accumulation of the charge generated in the photoelectric conversion section with the photoelectric conversion section,
the processing program being provided to cause a computer to execute subtraction of a noise signal level according to noise occurring in the capacitor due to temperature from a pixel signal level according to the charge generated in the photoelectric conversion section and accumulated in the photoelectric conversion section and the capacitor.

REFERENCE SIGNS LIST

21 VEHICLE CONTROL ECU
28 RECORDING SECTION (STORAGE SECTION)
51 CAMERA (IMAGING DEVICE)
51a PROCESSING SECTION
51b STORAGE SECTION
100 SOLID-STATE IMAGING DEVICE
101 PIXEL ARRAY SECTION
102 VERTICAL DRIVE CIRCUIT
103 COLUMN PROCESSING CIRCUIT
104 HORIZONTAL DRIVE CIRCUIT
105 SYSTEM CONTROLLER
108 SIGNAL PROCESSING SECTION
108a ACQUISITION SECTION
108b ARITHMETIC SECTION
109 DATA STORAGE SECTION (STORAGE SECTION)
109a FPN DATA
109b PROGRAM
SP PHOTOELECTRIC CONVERSION SECTION
SW SWITCH
C CAPACITOR

The invention claimed is:

1. A solid-state imaging device, comprising:
a plurality of pixels, wherein each of the plurality of pixels comprises:
a photoelectric conversion section configured to generate a charge based on an amount of received light; and
a capacitor configured to share accumulation of the generated charge with the photoelectric conversion section;
a storage section configured to store fixed pattern noise data indicating a noise signal level of each of the plurality of pixels; and
an arithmetic section configured to:
calculate the noise signal level based on an exposure period of the plurality of pixels, a temperature of the solid-state imaging device, and the stored fixed pattern noise data; and
subtract the noise signal level from a pixel signal level, wherein
the noise signal level is based on noise in the capacitor due to the temperature, and
the pixel signal level is based on the generated charge accumulated in the photoelectric conversion section and the capacitor.

2. The solid-state imaging device according to claim 1, wherein
the fixed pattern noise data is noise image data based on the noise signal level of each of the plurality of pixels, and
the arithmetic section is further configured to:
calculate the noise image data based on the exposure period, the temperature, and the fixed pattern noise data; and
subtract the calculated noise image data from pixel image data.

3. The solid-state imaging device according to claim 1, wherein
each of the plurality of pixels further includes a switch connected between the photoelectric conversion section and the capacitor,
the exposure period of the plurality of pixels includes:
a light accumulation exposure period in which the switch is controlled to one of a conductive state or a non-conductive state; and
a non-light accumulation exposure period in which the switch is controlled to the non-conductive state,
the noise signal level is based on exposure in the non-light accumulation exposure period, the pixel signal level is based on exposure in the light accumulation exposure period, and the arithmetic section is further configured to subtract the noise signal level that has undergone analog-digital (AD) conversion from the pixel signal level that has undergone the AD conversion.

4. The solid-state imaging device according to claim 3, wherein the arithmetic section is further configured to calculate the noise signal level corresponding to the light accumulation exposure period, based on the noise signal level corresponding to the exposure in the non-light accumulation exposure period.

5. The solid-state imaging device according to claim 3, wherein
the arithmetic section is further configured to subtract noise image data from pixel image data,
the noise image data is based on the noise signal level, and
the pixel image data is based on the pixel signal level.

6. The solid-state imaging device according to claim 3, wherein
the plurality of pixels is in an array,
the pixel signal level and the noise signal level undergo the AD conversion for each pixel row of the array, and
the arithmetic section is further configured to subtract, for each pixel row of the array, the noise signal level that has undergone the AD conversion from the pixel signal level that has undergone the AD conversion.

7. The solid-state imaging device according to claim 1, wherein
each of the plurality of pixels further includes a switch connected between the photoelectric conversion section and the capacitor,
the exposure period of the plurality of pixels includes:
a first period in which the switch is controlled to a non-conductive state; and
a second period in which the switch is controlled to a conductive state, the second period is subsequent to the first period, and the arithmetic section is further configured to:
calculate the noise signal level corresponding to a total period of the first period and the second period, based on the noise signal level corresponding to exposure in the first period, and
subtract the calculated noise signal level from the pixel signal level corresponding to exposure in the total period.

8. An imaging device, comprising:
a solid-state imaging device including:
a plurality of pixels, each of the plurality of pixels including:
a photoelectric conversion section configured to generate a charge based on an amount of received light; and
a capacitor configured to share accumulation of the generated charge with the photoelectric conversion section;
a storage section configured to store fixed pattern noise data indicating a noise signal level of each of the plurality of pixels; and
an arithmetic section configured to:
calculate the noise signal level based on an exposure period of the plurality of pixels, a temperature of the solid-state imaging device, and the stored fixed pattern noise data; and
subtract the noise signal level from a pixel signal level, wherein
the noise signal level is based on noise in the capacitor due to the temperature, and
the pixel signal level is based on the generated charge accumulated in the photoelectric conversion section and the capacitor.

9. The imaging device according to claim 8, wherein
the fixed pattern noise data is noise image data based on the noise signal level of each of the plurality of pixels, and
the arithmetic section is further configured to:
calculate the noise image data based on the exposure period, the temperature, and the fixed pattern noise data; and
subtract the calculated noise image data from pixel image data.

10. A processing method in a solid-state imaging device, the solid-state imaging device including
a plurality of pixels, each of the plurality of pixels including:
a photoelectric conversion section configured to generate a charge based on an amount of received light; and
a capacitor configured to share accumulation of the generated charge with the photoelectric conversion section,
the processing method, comprising:
storing fixed pattern noise data indicating a noise signal level of each of the plurality of pixels;
calculating the noise signal level based on an exposure period of the plurality of pixels, a temperature of the solid-state imaging device, and the stored fixed pattern noise data; and
subtracting the noise signal level from a pixel signal level, wherein
the noise signal level is based on noise in the capacitor due to the temperature, and
the pixel signal level is based on the generated charge accumulated in the photoelectric conversion section and the capacitor.

11. A non-transitory computer-readable medium having stored thereon, computer-executable instructions which, when executed by a processor in a solid-state imaging device, the solid-state imaging device including a plurality of pixels, each of the plurality of pixels including: a photoelectric conversion section configured to generate a charge based on an amount of received light; and a capacitor configured to share accumulation of the generated charge with the photoelectric conversion section, cause the processor to execute operations, the operations comprising:
storing fixed pattern noise data indicating a noise signal level of each of the plurality of pixels;
calculating the noise signal level based on an exposure period of the plurality of pixels, a temperature of the solid-state imaging device, and the stored fixed pattern noise data; and
subtracting the noise signal level from a pixel signal level, wherein
the noise signal level is based on noise in the capacitor due to the temperature, and
the pixel signal level is based on the generated charge accumulated in the photoelectric conversion section and the capacitor.

12. A processing method in an imaging device, the imaging device including a solid-state imaging device, the solid-state imaging device including a plurality of pixels, each of the plurality of pixels including:

a photoelectric conversion section configured to generate a charge based on an amount of received light; and a capacitor configured to share accumulation of the generated charge with the photoelectric conversion section, the processing method, comprising:

storing fixed pattern noise data indicating a noise signal level of each of the plurality of pixels;

calculating the noise signal level based on an exposure period of the plurality of pixels, a temperature of the solid-state imaging device, and the stored fixed pattern noise data; and subtracting the noise signal level from a pixel signal level, wherein the noise signal level is based on noise in the capacitor due to the temperature, and the pixel signal level is based on the generated charge accumulated in the photoelectric conversion section and the capacitor.

13. A non-transitory computer-readable medium having stored thereon, computer-executable instructions which, when executed by a processor in an imaging device, the imaging device including a solid-state imaging device, the solid-state imaging device including a plurality of pixels, each of the plurality of pixels including: a photoelectric conversion section configured to generate a charge based on an amount of received light; and a capacitor configured to share accumulation of the generated charge with the photoelectric conversion section, cause the processor to execute operations, the operations comprising:

storing fixed pattern noise data indicating a noise signal level of each of the plurality of pixels;

calculating the noise signal level based on an exposure period of the plurality of pixels, a temperature of the solid-state imaging device, and the stored fixed pattern noise data; and subtracting the noise signal level from a pixel signal level, wherein the noise signal level is based on noise in the capacitor due to the temperature, and the pixel signal level is based on the generated charge accumulated in the photoelectric conversion section and the capacitor.

* * * * *